United States Patent
Schachtel et al.

(10) Patent No.: US 9,652,255 B2
(45) Date of Patent: May 16, 2017

(54) WEB-BASED OPERATING SYSTEM FRAMEWORK

(71) Applicants: Ohad Schachtel, Tel Aviv (IL); Shahar Arusi, Moshav Yagal (IL)

(72) Inventors: Ohad Schachtel, Tel Aviv (IL); Shahar Arusi, Moshav Yagal (IL)

(73) Assignee: SAP Portals Israel Ltd, Ra'anana (IL)

( * ) Notice: Subject to any disclaimer, the term of this patent is extended or adjusted under 35 U.S.C. 154(b) by 258 days.

(21) Appl. No.: 13/771,786

(22) Filed: Feb. 20, 2013

(65) Prior Publication Data

US 2014/0237375 A1 Aug. 21, 2014

(51) Int. Cl.
G06F 3/048 (2013.01)
G06F 9/44 (2006.01)
G06F 17/30 (2006.01)
G06Q 10/10 (2012.01)

(52) U.S. Cl.
CPC ...... *G06F 9/4445* (2013.01); *G06F 17/30991* (2013.01); *G06Q 10/10* (2013.01)

(58) Field of Classification Search
CPC .................................................. G06F 3/048
See application file for complete search history.

(56) References Cited

U.S. PATENT DOCUMENTS

| 7,716,634 | B2 | 5/2010 | Ross et al. | |
|---|---|---|---|---|
| 8,082,294 | B2 | 12/2011 | Krahulec et al. | |
| 8,595,186 | B1 | 11/2013 | Mandyam et al. | |
| 8,739,249 | B1* | 5/2014 | Kay et al. | 726/3 |
| 2003/0184583 | A1 | 10/2003 | Lim | |
| 2007/0266111 | A1 | 11/2007 | Schubert | |
| 2008/0126511 | A1 | 5/2008 | Appaji | |
| 2008/0146245 | A1* | 6/2008 | Appaji | 455/456.1 |
| 2009/0287995 | A1 | 11/2009 | Tsao | |
| 2009/0320105 | A1* | 12/2009 | Jurkiewicz et al. | 726/5 |
| 2010/0037157 | A1 | 2/2010 | Chang et al. | |

(Continued)

FOREIGN PATENT DOCUMENTS

| CN | 101626485 A | 1/2010 |
|---|---|---|
| CN | 103078942 A | 5/2013 |

(Continued)

OTHER PUBLICATIONS

U.S. Appl. No. 13/597,632, filed Aug. 29, 2012 entitled "Enterprise Workspaces Externalization".

(Continued)

*Primary Examiner* — Xuyang Xia
(74) *Attorney, Agent, or Firm* — Fish & Richardson P.C.

(57) ABSTRACT

The disclosure generally describes computer-implemented methods, software, and systems for providing a web-based operating system framework for client devices. One computer-implemented method includes receiving portal login credentials from a client device, analyzing, by operation of a computer, configuration data to determine a desired graphical user interface (GUI) for the portal to present on the client device, determining to present a particular web operating system (WOS) GUI configuration on the client device, displaying a graphical element representing an available application on the determined WOS GUI configuration, and monitoring the WOS for GUI interactions associated with the graphical element.

19 Claims, 20 Drawing Sheets

(56) References Cited

U.S. PATENT DOCUMENTS

| | | | |
|---|---|---|---|
| 2010/0058182 A1* | 3/2010 | Jung | G06F 3/04883 |
| | | | 715/702 |
| 2010/0153865 A1* | 6/2010 | Barnes et al. | 715/762 |
| 2010/0153948 A1 | 6/2010 | Schreiber et al. | |
| 2011/0252375 A1* | 10/2011 | Chaudhri | G06F 3/04817 |
| | | | 715/835 |
| 2012/0005577 A1* | 1/2012 | Chakra et al. | 715/702 |
| 2012/0110073 A1 | 5/2012 | Chakra et al. | |
| 2012/0166997 A1* | 6/2012 | Cho | G06F 21/6218 |
| | | | 715/778 |
| 2013/0031462 A1* | 1/2013 | Calvo et al. | 715/762 |
| 2013/0055116 A1* | 2/2013 | Kern et al. | 715/234 |
| 2013/0148891 A1 | 6/2013 | Yassin | |
| 2014/0006977 A1 | 1/2014 | Adams | |
| 2014/0136531 A1 | 5/2014 | Aflalo et al. | |

FOREIGN PATENT DOCUMENTS

| | | |
|---|---|---|
| EP | 1126674 A2 | 8/2001 |
| WO | WO-2008139993 A1 | 11/2008 |

OTHER PUBLICATIONS

U.S. Appl. No. 13/674,665, filed Nov. 12, 2012 entitled "Managing Delivery of Contextual Content".

Office Action issued in U.S. Appl. No. 13/772,020 mailed Mar. 23, 2015; 12 pages.

Office Action issued in U.S. Appl. No. 13/772,020 mailed Jul. 6, 2015; 12 pages.

Office Action issued in U.S. Appl. No. 13/772,020 mailed Nov. 23, 2015; 12 pages.

Office Action issued in U.S. Appl. No. 13/772,020 mailed on Jul. 21, 2016; 15 pages.

* cited by examiner

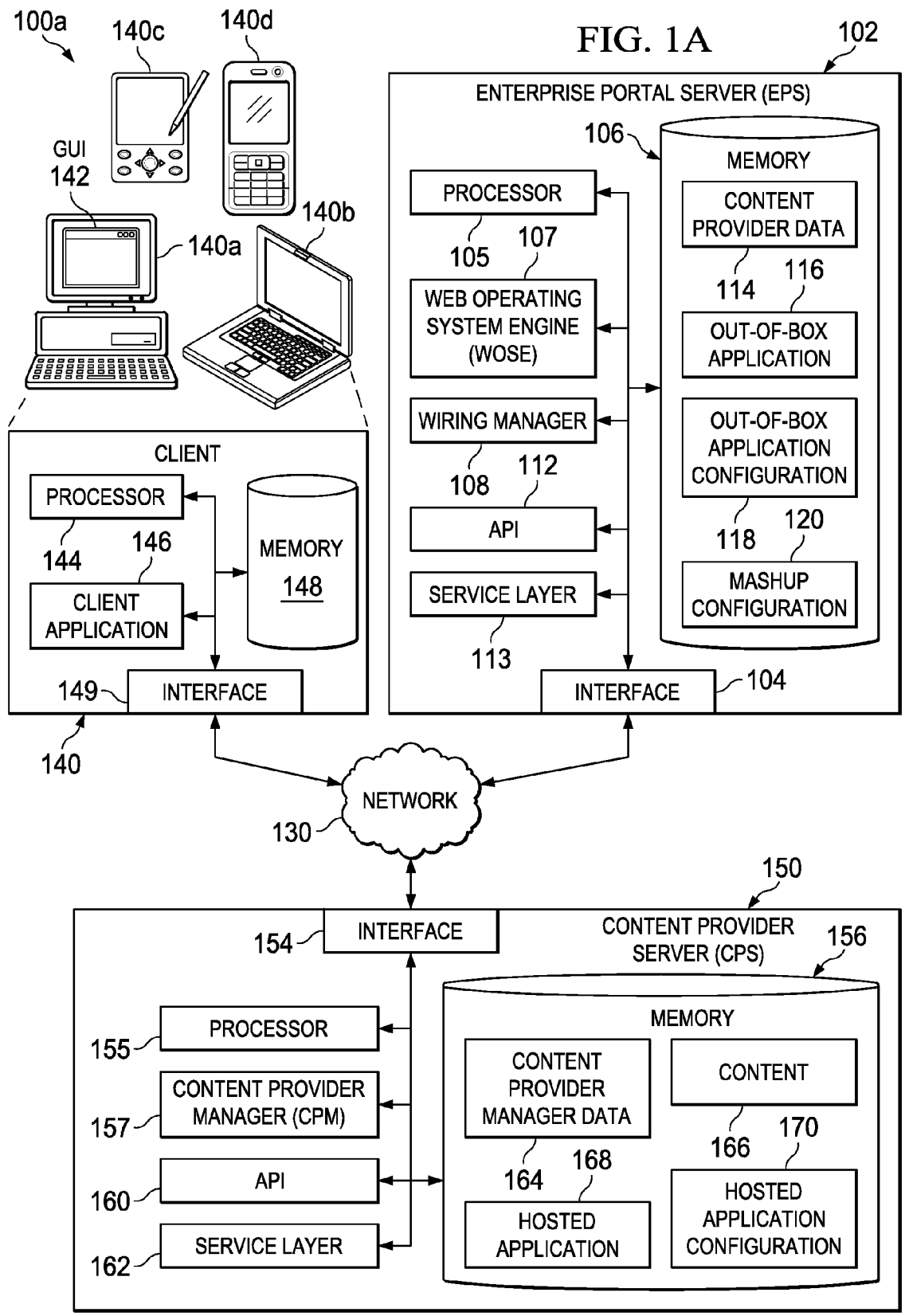

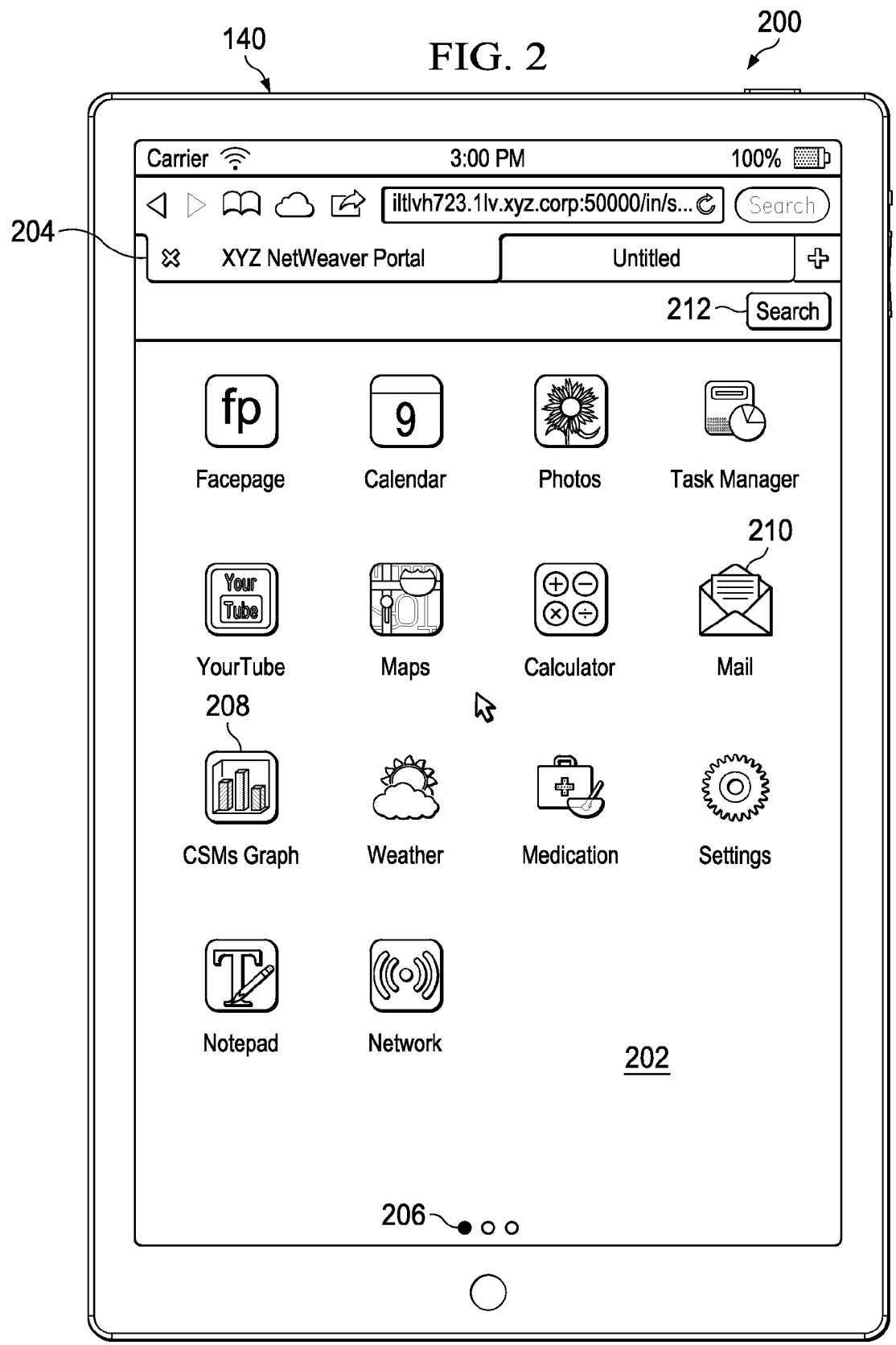

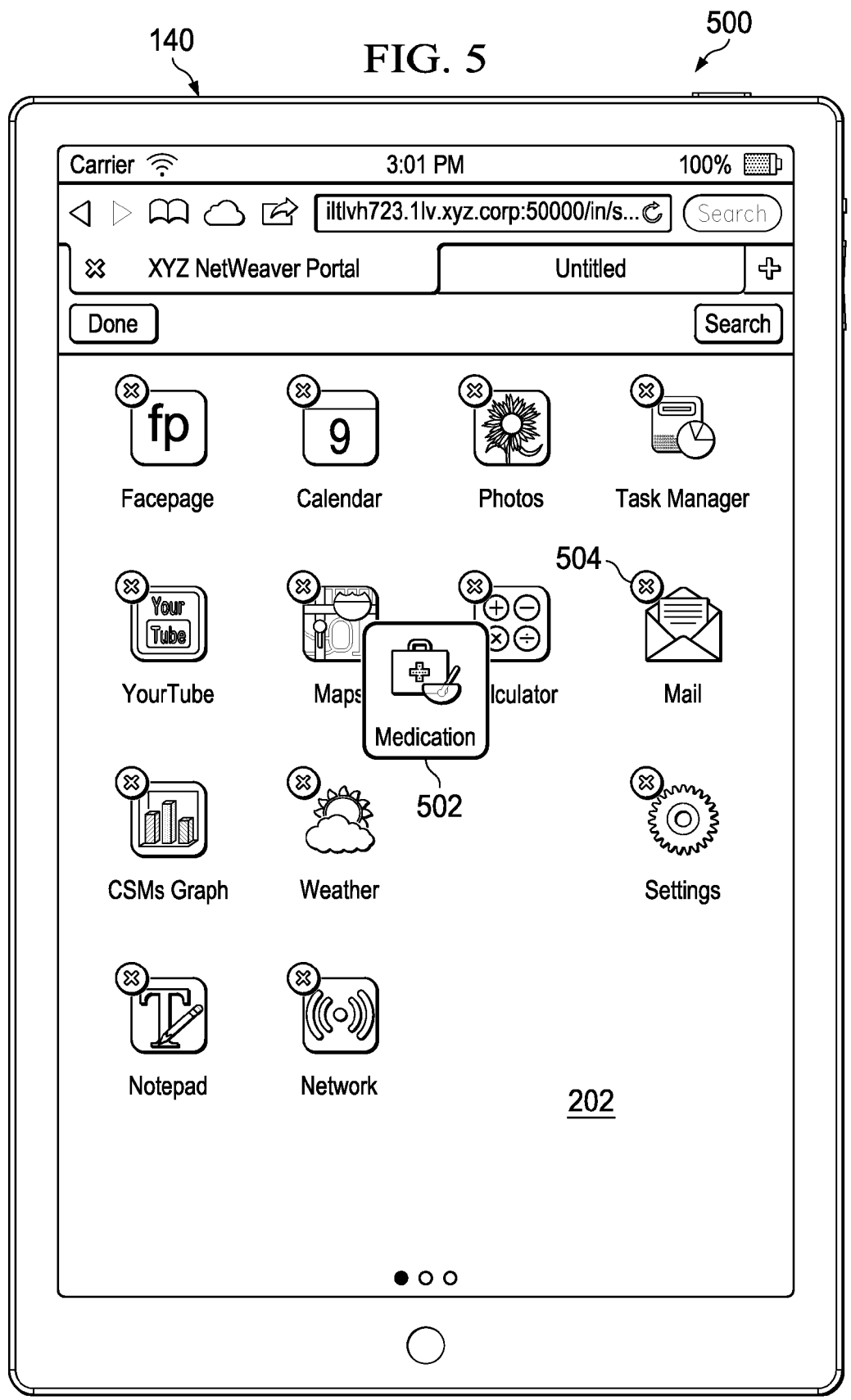

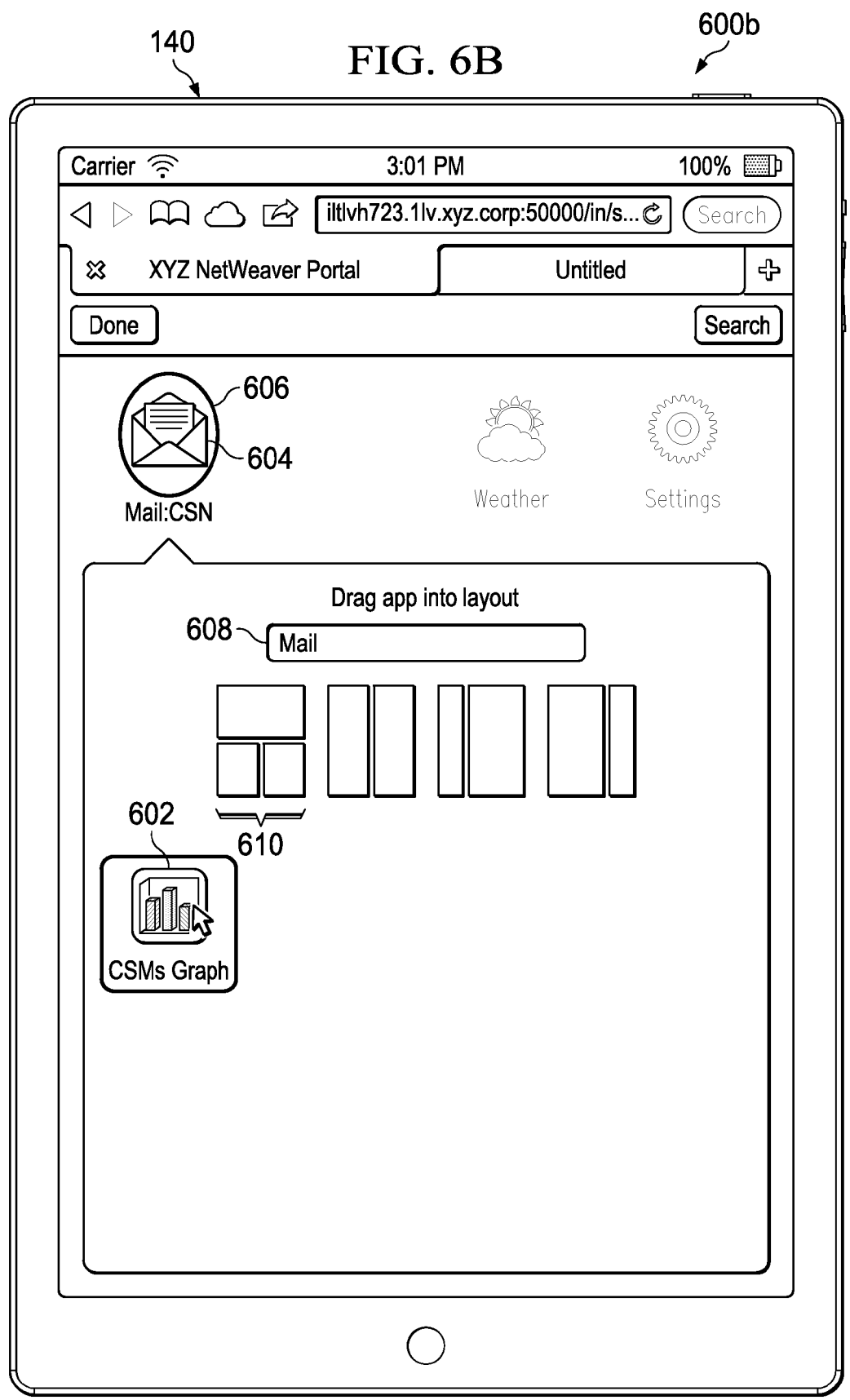

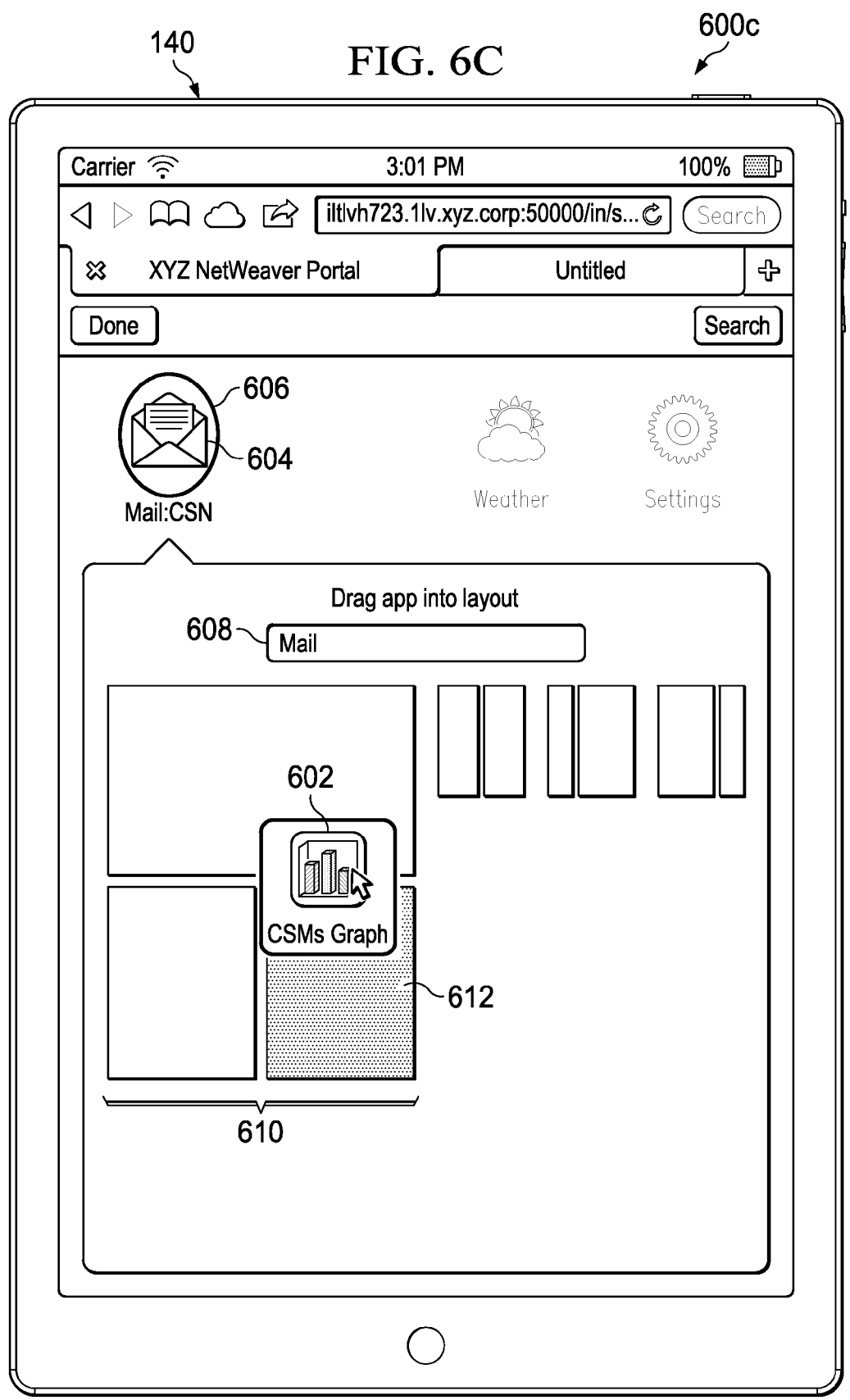

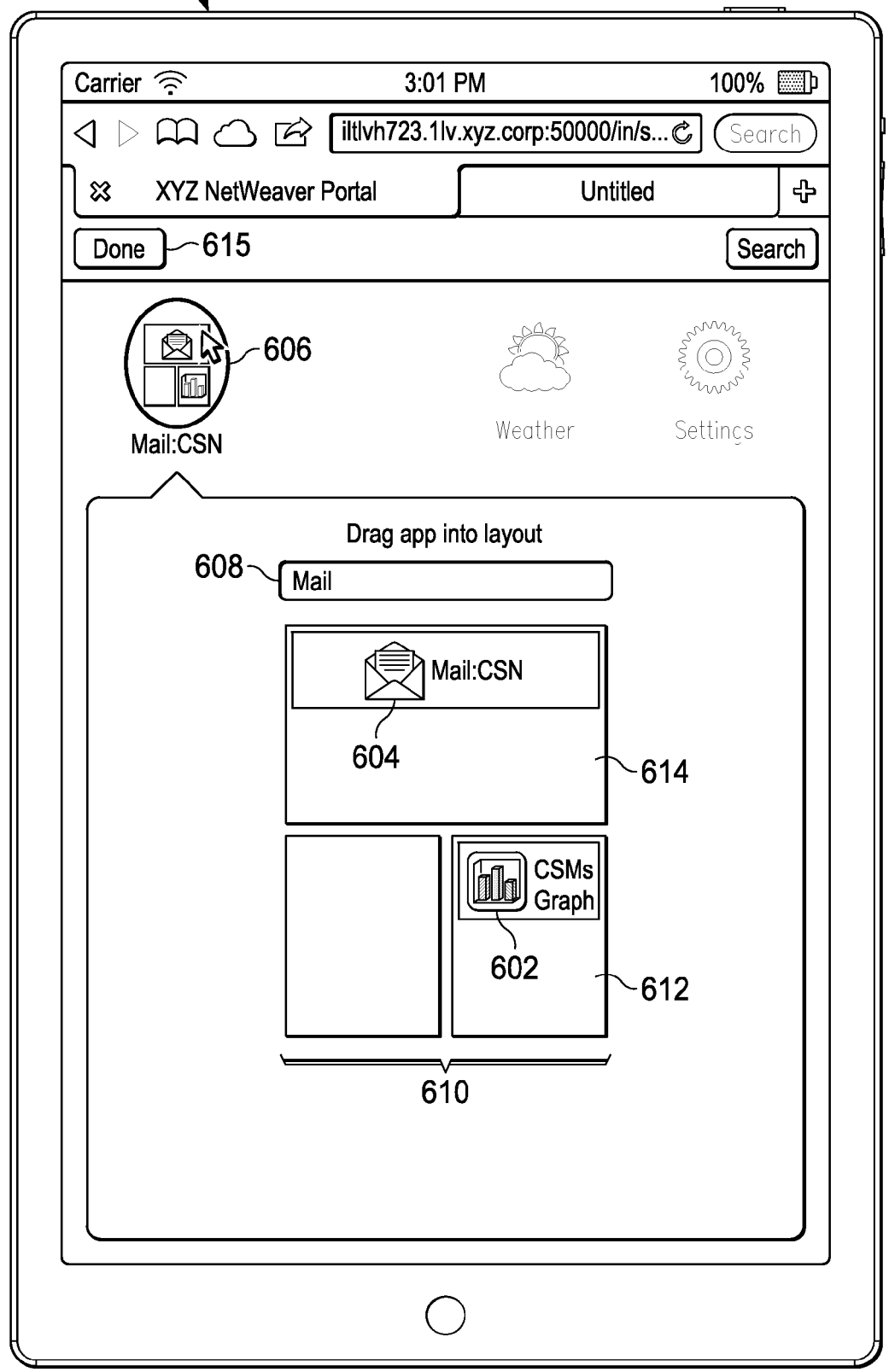

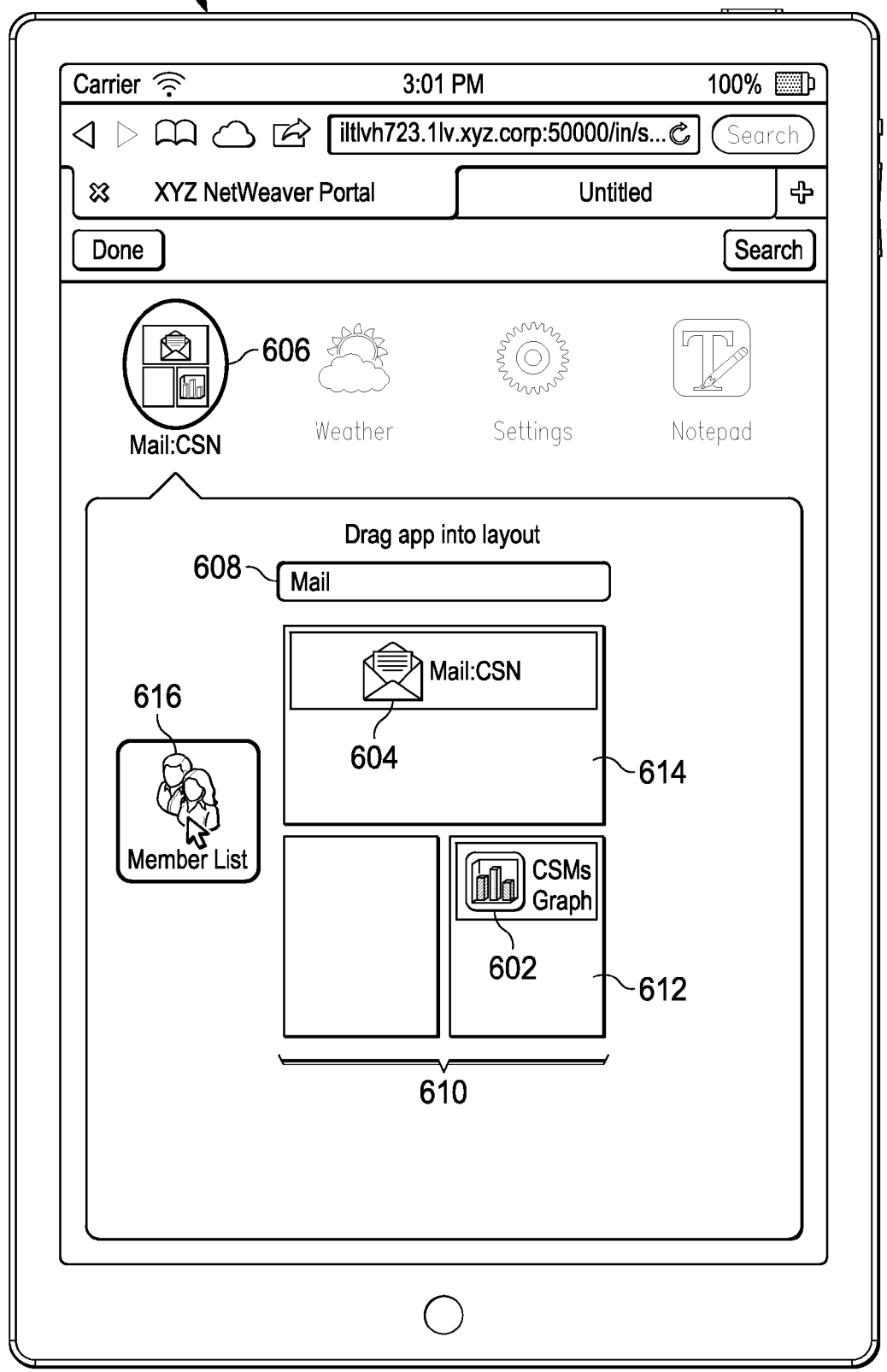

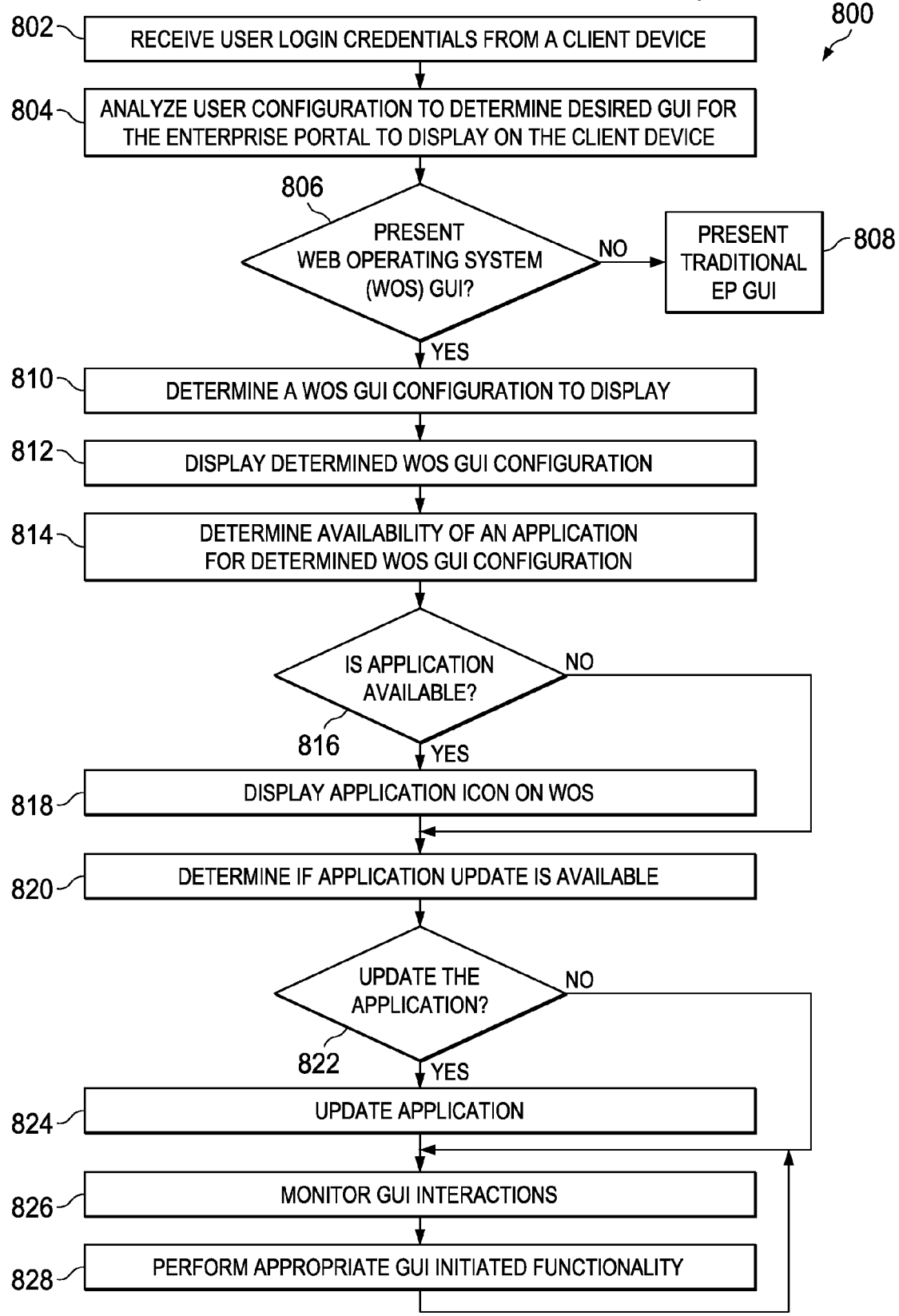

WEB-BASED OPERATING SYSTEM FRAMEWORK

CROSS-REFERENCE TO CO-PENDING APPLICATION

This application is related to co-pending U.S. patent application Ser. No. 13/772,020, filed on Feb. 20, 2013, the entire contents of which are hereby incorporated by reference.

BACKGROUND

A web portal may use various web-based graphical user interface (GUI) designs to present aggregated portal content to web portal users. These GUI designs may include web pages with content arranged and presented to the web portal users on the web page as text, tables, dialogs, animations, audio, and the like. Application software, or an application, is computer software designed to run within an operating system and to perform specific tasks/functionality for a user. Web portals, however, do not currently have an ability to permit the use of web-based applications within a web-based operating system framework. As a result, the provision of additional enhanced services and content to the web portal users, such as GUI manipulations, collaborations, functionality streamlining/reusability, and web-application mashups, are either restricted or limited in scope and functionality by existing web technology.

SUMMARY

The present disclosure relates to computer-implemented methods, software, and systems for providing a web-based operating system framework. One computer-implemented method includes receiving portal login credentials from a client device, analyzing, by operation of a computer, configuration data to determine a desired graphical user interface (GUI) for the portal to present on the client device, determining to present a particular web operating system (WOS) GUI configuration on the client device, displaying a graphical element representing an available application on the determined WOS GUI configuration, and monitoring the WOS for GUI interactions associated with the graphical element.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features:

A first aspect, combinable with the general implementation, wherein the determination of the particular WOS GUI configuration to present on the client device is based upon one of the client device type, the configuration data, portal administrator settings, or historical data.

A second aspect, combinable with the general implementation, wherein the particular WOS configuration is one or more of a reflection of the client device's native operating system GUI, a GUI interface of a particular operating system not native to the client device, or a combination of the client device's native operating system GUI and the particular operating system GUI not native to the client device.

A third aspect, combinable with the general implementation, further configured to determine an availability of the application for the determined WOS GUI interface configuration.

A fourth aspect, combinable with the general implementation, further configured to determine whether the application has an available update.

A fifth aspect, combinable with the general implementation, further configured to perform appropriate functionality based upon monitored GUI interactions associated with the graphical element.

A sixth aspect, combinable with the general implementation, further configured to initiate an application mashup operation by overlaying two graphical elements on the WOS GUI.

The subject matter described in this specification can be implemented in particular implementations so as to realize one or more of the following advantages. First, web applications would allow computer software designed for specific tasks to be distributed as desired to provide default functionality or higher-level functionality that could be bundled and sold in various configurations. Second, the use of web applications would allow a web portal on a mobile device to provide a configurable look and feel to the web portal experience. For example, a particular web portal user could select the web portal to provide a similar look at feel and functionality to the web portal as the native operating system provides on their mobile device used to interact with the web portal, while another web portal user may choose a different look and feel. Third, the provided web applications can work together to provide a seamless experience for a web-portal user. For example, selecting a function to share a result from a web application can open another web application or interface with the web application framework to provide the requested functionality. Fourth, enhanced sharing and search capabilities can be provided by the web application framework for both users and web applications. For example, web applications can be interfaced to leverage the sharing and/or search functionality provided by other web applications and users can easily access the provided sharing and search functionality. Fifth, mashups (wiring) of web applications can be performed by simple drag-and-drop or other suitable operations to provide enhanced application collaboration for one or more users. The ability to wire web applications greatly enhances the functionality provided by single web applications by allowing the creation of almost limitless aggregated web applications to provide content from the aggregated web applications in a form useful for one or more web portal users.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 1A is a block diagram illustrating an example distributed computing system 100a for providing a web-based operating system framework for client devices in a cloud-type computing environment according to one implementation.

FIG. 2 illustrates an example screenshot of a web operating system (WOS) home page with associated web applications according to one implementation.

FIG. 5 illustrates an example screenshot of drag-and-drop functionality for web application icons on the WOS homepage according to one implementation.

FIG. 6B illustrates an example screenshot of a layout manager displayed to format a requested web application mashup according to one implementation.

FIG. 6C illustrates an example screenshot of a layout manager position indication for a web application according to one implementation.

FIG. 6D illustrates an example screenshot of a layout manager with a second web application dynamically inserted into a layout position according to one implementation.

FIG. 6F illustrates an example screenshot of adding a third web application to the mashup web application of FIG. 6E according to one implementation.

FIG. 8 is a flow chart of an example method for providing a web-based operating system framework for client devices.

Like reference numbers and designations in the various drawings indicate like elements.

DETAILED DESCRIPTION

Figure 1B:
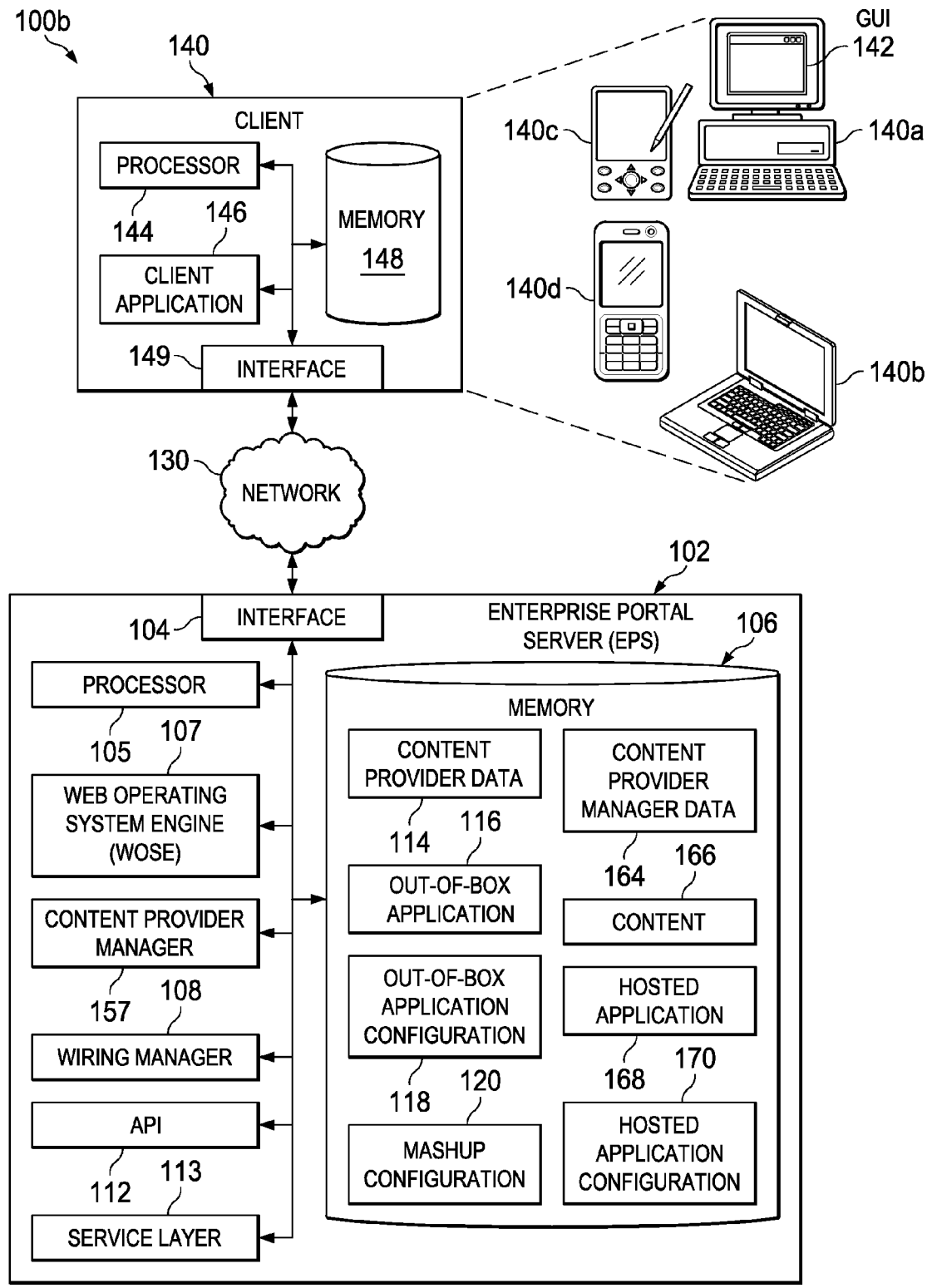
FIG. 1B is a block diagram illustrating an example distributed computing system 100b for providing a web-based operating system framework for client devices according to one implementation.

The disclosure generally describes computer-implemented methods, software, and systems for providing a web-based operating system framework for client devices.

For the purposes of this disclosure, a mashup is web application that combines ("wires") heterogeneous data, user interface (UI) components, and/or logic/functionality provided, for example by web applications, from multiple diverse sources to create new and more useful aggregated data, functionality, and/or views not provided by the original sources. The mashups send, store, receive, and/or provide the combined data and/or functionality typically through web browsers or other suitable applications using HTML/XHTML, CSS, JAVASCRIPT, XML, JSON, KML, and other suitable technologies. Mashups typically use associated defined application programming interfaces (APIs) and other suitable interface methods such as XML, JSON, SOAP, REST, and the like and may be secured using various access control and security methods for data and/or web applications.

Mashups are generally created from client web applications that may be accessed by one or more clients from hosting servers controlled by a particular entity and/or third party. The data/functionality provided by the web applications can be wired into a single presentation allowing collaboration among, for example, businesses, businesses and developers, developers and customers, etc.

Typically, mashups are of two types, web-based and server-based. Web-based mashups typically leverage a user's browser or other equivalent tool to wire and configure web-applications/data. Server-based mashups use remote servers to perform the wiring, configuration, and/or execution of the mashup and transmit associated data from the mashup to the client, for example in a cloud-computing type environment. For the purposes of this application, either type or a combination of the described mashup types is envisioned to be within scope of this disclosure. Further, other types of mashups consistent with this disclosure are also envisioned to be within the scope of this disclosure.

Various graphical user interface (GUI) tools can be used to define and wire web applications to create mashups. The GUI tools can allow, for example, a developer to drag-and-drop web applications on top of each other in a GUI interface, specify applications to wire together, and the like. The GUI tools may also allow existing web applications to be analyzed for API in/out data ports to use for mashups in order to gain more "life" from existing web applications. Mashups may be reusable and offered for use by multiple users in collaborative efforts as well as easily updated for all collaborative effort users.

For the purposes of this disclosure, an enterprise portal (EP) is a framework for integrating information, people, and processes across organizational boundaries. An EP provides a secure unified access point, often in the form of a web-based user interface, and is designed to aggregate and personalize information through application-specific sub-portals. The EP is a de-centralized content contribution and content management system, which keeps the information always updated. With only a web browser, EP users can begin work once they have been authenticated in the EP which offers a single point of access to information, enterprise applications, and services both inside and outside an organization. EPs may present information from diverse sources on mobile or other devices in a unified and structured way, and provide additional services, such as mashups, dashboards, an internal search engine, e-mail, news, navigation tools, and various other features. EPs are often used by enterprises for providing their employees, customers, and possibly additional EP users with a consistent look and feel, and access control and procedures for multiple applications, which otherwise would have been separate entities altogether.

FIG. 1A is a block diagram illustrating an example distributed computing system 100a for providing a web-based operating system framework for client devices in a cloud-type computing environment according to one implementation. The illustrated example distributed computing system 100a includes or is communicably coupled with an EP server (EPS) 102, a content provider server (CPS) 150, and a client 140 that communicate across a network 130.

At a high level, the EPS 102 is an electronic computing device operable to receive, transmit, process, store, or manage data and information associated with the example distributed computing system 100a. Generally, the EPS 102 provides an EP allowing users to view, compose, modify, delete, and deploy EP pages. Specifically, the described computer-implemented methods, software, and systems also provide functionality for providing a web-based operating system (WOS) framework for client devices using a GUI providing an EP user with an efficient, user-friendly, and secure presentation of data provided by or communicated within the example distributed computing system 100a.

The EPS 102 is responsible for receiving application requests, for example EP content requests and WOS GUI requests, from one or more client applications 146 associated with a particular client 140 of the example distributed computing system 100a and responding to the received requests by processing the received EP content requests in a web operating system engine 107 and/or wiring manager 108, and sending an appropriate response from the web operating system engine 107 and/or wiring manager 108 back to the requesting client application 146. In addition to requests from the client 140, requests associated with the web operating system engine 107 and/or wiring manager 108 may also be sent from internal EP users, external or third-party customers, other automated applications, as well as any other appropriate entities, individuals, systems, or computers associated with the EPS 102 and/or other components of the example distributed computing system 100a. According to one implementation, the EPS 102 may also include or be communicably coupled with an e-mail server, a web server, a caching server, a streaming data server, and/or other suitable server.

The EPS 102 contains a web operating system engine 107 and/or wiring manager 108. At least a portion of the web operating system engine 107 and/or wiring manager 108 is executed using requests/responses sent from/to a client 140 within and communicably coupled to the illustrated example distributed computing system 100a using network 130. In some implementations, requests/responses can be sent directly to EPS 102 from a user accessing EPS 102 directly. In some implementations, the EPS 102 may store a plurality of various web operating system engines 107 and/or wiring managers 108. In some implementations, the EPS 102 may comprise a web server, where one or more of the components of EPS 102 represent web-based applications accessed and executed by the client 140 using the network 130 or directly at the EPS 102 to perform the programmed tasks or operations of the various components of the EPS 102.

In some implementations, any and/or all of components of the EPS 102, both hardware and/or software, may interface with each other and/or an interface 104 using an application programming interface (API) 112 and/or a service layer 113. The API 112 may include specifications for routines, data structures, and object classes. The API 112 may be either computer language independent or dependent and refer to a complete interface, a single function, or even a set of APIs. The service layer 113 provides software services to the example distributed computing system 100a. The functionality of the EPS 102 may be accessible for all service consumers using this service layer. Software services, such as provide reusable, defined business functionalities through a defined interface. For example, the interface may be software written in JAVA, C++, or other suitable language providing data in extensible markup language (XML) format or other suitable format.

While illustrated as an integrated component of the EPS 102 in the example distributed computing system 100a, alternative implementations may illustrate the API 112 and/or service layer 113 as a stand-alone component in relation to other components of the example distributed computing system 100a. Moreover, any or all parts of the API 112 and/or service layer 113 may be implemented as child or sub-modules of another software module, enterprise application, or hardware module without departing from the scope of this disclosure.

The EPS 102 includes an interface 104. Although illustrated as a single interface 104 in FIG. 1, two or more interfaces 104 may be used according to particular needs, desires, or particular implementations of the example distributed computing system 100a. The interface 104 is used by the EPS 102 for communicating with other systems in a distributed environment—including within the example distributed computing system 100a—connected to the network 130; for example, the client 140 as well as other systems (not illustrated) communicably coupled to the network 130. Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100a.

The EPS 102 includes a processor 105. Although illustrated as a single processor 105 in FIG. 1, two or more processors may be used according to particular needs, desires, or particular implementations of the example distributed computing system 100a. Generally, the processor 105 executes instructions and manipulates data to perform the operations of the EPS 102. Specifically, the processor 105 executes the functionality required to provide a WOS framework for client devices.

The EPS 102 also includes a memory 106 that holds data for the EPS 102. Although illustrated as a single memory 106 in FIG. 1, two or more memories may be used according to particular needs, desires, or particular implementations of the example distributed computing system 100a. While memory 106 is illustrated as an integral component of the EPS 102, in alternative implementations, memory 106 can be external to the EPS 102 and/or the example distributed computing system 100a. In some implementations, the memory 106 holds/manages the description and/or data for all objects in the EPS 102, includes one or more instances of content provider data 114, an out-of-box application 116, an out-of-box application configuration 118, and a mashup configuration 120.

The content provider data 114 may include any type of data associated with and/or used by the EPS 102 to locate and interface with a content provider server (CPS) 150. The content provider data 144 may include CPS 150 locations, addresses, storage specifications, content lists, access requirements, and/or other suitable data. For example, for a database CPS 150, the content provider data 114 may include the server Internet Protocol (IP) address, Uniform Resource Locator (URL), database type, minimum technical access requirements, access permission requirements, data download speed specifications, etc.

The out-of-box-application 116 can be any application, program, module, process, or other computer software that may execute in a web-based environment to perform a specific task/functionality for an EP user and is typically provided to an EP user by default for use in the WOS. In some implementations, some out-of-box applications 116 may be available only if the EP user has specific security credentials, role, etc. Typically, the out-of-box application 116 is executed locally on the EPS 102. In other implementations, the hosted application 168 can be transmitted to another processing environment, such as CPS 150 and/or the client 140 to be executed and to either directly share data with the processing environment or transmit the data with another associated processing environment or component of the example distributed computing system 100*a*. In some implementations, one or more out-of-box applications 116 can be executed in parallel within one or among multiple processing environments. The out-of-box application 116 can be combined with other applications, for example, other out-of-box applications 116 and/or hosted applications 168, to create mashups. In some implementations, hosted applications 168 and/or out-of-box applications 116 in the context of a mashup can run on separate processing environments. For example, a hosted application 168 can run on the CPS 150 while an out-of-box application can executed on the EPS 102 as long as the results of the executing applications can be accessed/received using at least network 130.

The out-of-box application configuration 118 is any data providing identification, interface requirements, mashup, available functionality (e.g., search, share, etc.), security, cost, ratings, EP user comments, authorship/ownership, location, hosting information, execution requirements, identifying graphic (e.g., an icon), and/or other suitable information associated with the out-of-box application 116. For example, out-of-box application configuration 118 can include data describing in/out ports and transmitted data types/formats, required applications/configurations, and security requirements which are used by the wiring manager 108 to set a default mashup configuration when an out-of-box application 116 is associated with a hosted application 168 using a mashup GUI tool executed by the WOSE 107 and/or wiring manager 108 to create a mashup. The out-of-box application configuration 118 could also be used to decide which out-of-box application 116 may suit an EP user's requirements. For example, an EP user could read an associated description generated in a GUI tool (not illustrated) to allow the EP user to browse and select an out-of-box application 116 based on various entered criteria, such as business use, tax calculation, email reading, and the like. In some implementations, the out-of-box application configuration 118 can also be accessed by the CPS 150 and/or the client 140 for particular needs, desires, or particular implementations of the example distributed computing system 100*a*.

The mashup configuration 120 is any data providing an identification, description, configuration, interface requirements, security, cost, ratings, EP user comments, authorship/ownership, location, hosting information, execution requirements, application availability status, and/or other suitable mashup configuration information. For example, the mashup configuration 120 can specify that an application "App6" is wired with an application "App1" and that this mashup has been rated by EP users as only one out of five stars. The mashup configuration 120 can also specify that "App6" is wired with "App2" and this mashup has a five star rating. An EP user investigating available mashups and component applications and their wiring relationships might conclude that the mashup of "App6" and "App2" will be more useful for their purpose assuming that both "App1" and "App2" provide at least similar functionality. In some implementations, the mashup configuration 120 can also provide data on applications that are eligible for wiring, but have not been downloaded by an EP user. Other suitable configuration data provided by the mashup configuration 120 will be apparent to those of skill in the art.

The web operating system engine (WOSE) 107 can be any application, program, module, process, or other software that may provide WOS GUI environment (hereinafter "WOS") to a client 140. In some implementations, the generated WOS can emulate the look and feel of the client 140 device native operating system, for example APPLE IOS, ANDROID, BLACKBERRY OS, and the like. In other implementations, a generated WOS can emulate a look and feel of an operating system completely different than the host client 140 device's operating system. For example, the WOSE 107 could emulate an ANDROID mobile device GUI as a web-based EP GUI on an APPLE IPAD computing device acting as a client 140. In some implementations, the choice of a generated WOS can be associated with a specific EP user's profile, a group profile, and the like. For example, EP user configuration data (not illustrated) could be stored in memory 148 on the client 140, in memory 106 of EPS 102, and/or memory 156 or CPS 150 that specifies the WOS for the WOSE 107 to generate on a particular client device 140. In some implementations, respective configuration data associated with desired hosted applications 168 and/or out-of-box applications 116 can specify required/preferred WOS configurations that are taken into consideration by the WOSE 107 as to which WOS to use. In some implementations, the EP user is provided with choices, for example a radio button list of which WOS to execute when logging into an EP.

In some implementations, the WOSE 107 can also provide mashup functionality for two or more hosted applications 168 and/or out-of-box applications 116 or provide an interface to trigger additional GUI-based applications, software, and/or tools to perform the application wiring for a desired mashup. For example, if an EP user drags a hosted application 168 on top of an out-of-box application 116 within the WOS, the WOSE can launch functionality built-in to the WOSE 107 to allow the EP user to wire the applications together into a mashup or can launch the wiring manager 108 to provide/perform some or all of this functionality. In some implementations, the wiring of applications results in the creation/modification of one or more associated instances of mashup configurations 120.

In some implementations, the WOSE 107 can also provide functionally for an EP user, either alone or in conjunction with the wiring manager 108, to search for, visualize, browse, define, and/or edit mashups. For example, the WOSE 107 can access the mashup configuration 120 associated with the EP user to determine if any mashups are available for the EP user, which applications may be available/necessary for mashups, the EP user's security status with respect to any mashups and associated applications, and the like. The WOSE 107 and/or the wiring manager 108 can then display a graphical depiction of one or more mashups for the EP user and provide and/or allow access to functionality associated with the one or more mashups.

A particular WOSE 107 may operate in response to and in connection with at least one request received from other WOSEs 107, including a WOSE 107 associated with another EPS 102, as well as other components of the example distributed computing system 100a. In some implementations, the WOSE 107 can be and/or include a web server. In some implementations, each WOSE 107 can represent a network-based application accessed and executed using the network 130 (e.g., through the Internet, or using at least one cloud-based service associated with the WOSE 107). For example, a portion of a particular WOSE 107 may be a Web service associated with the WOSE 107 that is remotely called, while another portion of the WOSE 107 may be an interface object or agent bundled for processing at a remote client 140. Moreover, any or all of a particular WOSE 107 may be a child or sub-module of another software module or enterprise application (not illustrated) without departing from the scope of this disclosure. Still further, portions of the particular WOSE may be executed or accessed by an EP user working directly at the EPS 102, as well as remotely at a corresponding client 140.

The wiring manager 108 can be any application, program, module, process, or other software that may provide wiring and/or mashup functionality to a client 140. The wiring manager 108 can provide mashup functionality for two or more hosted applications 168 and/or out-of-box applications 116 or provide an interface, possibly through the WOS, to trigger additional GUI-based applications, software, and/or tools to perform the application wiring for a desired mashup. For example, if an EP user drags a hosted application 168 on top of an out-of-box application 116 within the WOS, the wiring manager 108 can launch built-in functionality to allow the EP user to wire the applications together into a mashup or interface with the WOSE 107 to launch a GUI to provide/perform some or all of this functionality. In some implementations, the wiring manager would create/modify one or more instances of a mashup configuration 120.

In some implementations, the wiring manager 108 can also provide functionally for an EP user, either alone or in conjunction with the WOSE 107, to search for, visualize, browse, define, and/or edit mashups. For example, the WOSE 107 can access one or more mashups associated with the EP user, whether any applications are available/necessary for mashups, the EP user's security status with respect to any mashups and associated applications, and the like. The WOSE 107 and/or the wiring manager 108 can then display a graphical depiction of one or more mashups for the EP user and provide and/or allow access to functionality associated with the mashups.

A particular wiring manager 108 may operate in response to and in connection with at least one request received from other wiring managers 108, including a wiring manager 108 associated with another EPS 102, as well as other components of the example distributed computing system 100a. In some implementations, the wiring manager 108 can be and/or include a web server. In some implementations, each wiring manager 108 can represent a network-based application accessed and executed using the network 130 (e.g., through the Internet, or using at least one cloud-based service associated with the wiring manager 108). For example, a portion of a particular wiring manager 108 may be a Web service associated with the wiring manager 108 that is remotely called, while another portion of the wiring manager 108 may be an interface object or agent bundled for processing at a remote client 140. Moreover, any or all of a particular wiring manager 108 may be a child or sub-module of another software module or enterprise application (not illustrated) without departing from the scope of this disclosure. Still further, portions of the particular WOSE may be executed or accessed by an EP user working directly at the EPS 102, as well as remotely at a corresponding client 140.

At a high level, the CPS 150 is typically a third-party electronic computing device operable to host, receive, transmit, process, store, or manage applications, data, and/or information associated with the example distributed computing system 100a that is managed apart from mangers of the EPS 102. Specifically, the CPS 150 provides content 166 and or hosted applications 168 to the EPS 102 for use by the client 140.

The CPS 150 is responsible for receiving application requests, for example content 166 and/or hosted application 168 requests from the EPS 102 and/or client application 146 associated with a particular client 140 of the example distributed computing system 100b and responding to the received requests by processing the received requests in a content provider manager 157 and sending an appropriate response back to the requesting EPS 102 and/or client application 146. In addition to requests from the EPS 102 and/or client 140, requests associated with the content provider manager 157 may also be sent from internal users, external or third-party customers, other automated applications, as well as any other appropriate entities, individuals, systems, or computers associated with the CPS 150 and/or other components of the example distributed computing system 100a. According to one implementation, the CPS 150 may also include or be communicably coupled with an e-mail server, a web server, a caching server, a streaming data server, and/or other suitable server.

The CPS 150 contains a content provider manager (CPM) 157. At least a portion of the CPM 157 is executed using requests/responses sent from/to the EPS 102 and/or client 140 within and communicably coupled to the illustrated example distributed computing system 100a using network 130. In some implementations, requests/responses can be sent directly to the CPS 150 from a user accessing CPS 150 directly. In some implementations, the CPS 150 may store a plurality of various CPMs 157. In some implementations, the CPS 150 may comprise a web server, where one or more of the components of CPS 150 represent web-based applications accessed and executed by the EPS 102 and/or client 140 using the network 130 or directly at the CPS 150 to perform the programmed tasks or operations of the various components of the CPS 150. In some implementations, any and/or all of components of the CPS 150, both hardware and/or software, may interface with each other and/or an interface 154 using an application programming interface (API) 160 and/or a service layer 162 consistent with the API 112 and/or service layer 113 and components of EPS 102 described above or different according to particular needs, desires, or particular implementations of the CPS 150.

The interface 154 may also be consistent with the above-described interface 104 of the EPS 102 or other interfaces within the example distributed computing system 100a. The processor 155 may be consistent with the above-described processor 105 of the EPS 102 or other processors within the example distributed computing system 100a. Specifically, the processor 155 executes instructions and manipulates data to perform the operations of the CPS 150, including the functionality required to send requests to the EPS 102 and/or client 140 and to receive and process respective responses. The memory 156 may be consistent with the above-described memory 106 of the EPS 102 or other memories within the example distributed computing system 100a but storing objects and/or data associated with the purposes of the CPS 150. Memory 156 may also be used by the EPS 102 and/or other components of the example distributed computing system 100a to store any type of data for the purposes of the storing component. In some implementations, the memory 156 holds/manages the description and/or data for all objects in the CPS 150 and includes one or more instances of content provider manager data 164, content 166, a hosted application 168, and/or a hosted application configuration 170.

The content 166 is encountered as part of the user experience when interacting with an EP, such as that provided by EPS 102. For example, content may be accessing when requesting an EP page, web application, etc. containing a content object (not illustrated). The content 166 may include, among other things: text, images, sounds, videos, animations, and/or the like. While illustrated as integrated with memory 156 in the CPS 150, in alternative implementations, the content 166 can be external to the CPS 150 and/or the example distributed computing system 100a, for example associated with other external content providers (not illustrated), or can be internal to the CPS 150, for example stored within a content object itself. In some implementations, content 166 can contain properties apart from an associated content object.

The hosted application 168 can be any application, program, module, process, or other computer software that may execute in a web-based environment to perform a specific task/functionality for a user. Typically, the hosted application is owned and managed by a third-party separate from the party managing the EPS 102 and associated out-of-box applications 118. In some implementations, the hosted application 168 can be executed remotely from a hosting server, for example CPS 150, and for resultant data to be transmitted to a recipient such as the EPS 102 and/or client 140. In other implementations, the hosted application 168 can be transmitted to another processing environment, such as EPS 102 and/or the client 140 to be executed and to either directly share data with the processing environment or transmit the data with another associated processing environment or component of the example distributed computing system 100a. In some implementations, one or more hosted applications 168 can be executed in parallel within one or among multiple processing environments. The hosted application 168 can be combined with other various applications, for example, out-of-box applications 116 associated with the EPS 102, to create mashups. In some applications, hosted applications 168 and/or out-of-box applications 116 in the context of a mashup can run on separate processing environments. For example, a hosted application 168 can run on the CPS 150 while an out-of-box application can executed on the EPS 102 as long as the results of the executing applications can be accessed/received using at least network 130.

The hosted application configuration 170 is any data providing identification, interface requirements, mashup, available functionality (e.g., search, share, etc.), security, cost, ratings, user comments, authorship/ownership, location, hosting information execution requirements, identifying graphic (e.g., an icon), and/or other suitable information associated with the hosted application 168. For example, hosted application configuration 170 can include data describing in/out ports and transmitted data types/formats, required applications/configurations, and security requirements which are used by the wiring manager 108 to set a default mashup configuration when a hosted application 168 is associated with an out-of-box application 118 using a mashup GUI tool executed by the WOSE 107 and/or wiring manager 108 to create a mashup. The hosted application configuration 170 could also be used to decide which hosted application 168 may suite a user's requirements. For example, a user could read an associated description generated in a GUI tool (not illustrated) to allow a user to browse and select a hosted application 168 based on various entered criteria, such as business use, tax calculation, email reading, and the like. In some implementations, the hosted application configuration 170 can also be accessed by the EPS 102 and/or the client 140 for particular needs, desires, or particular implementations of the example distributed computing system 100a.

The content provider manager (CPM) 157 can be any application, program, module, process, or other software that may access, transmit, execute, change, delete, generate, or otherwise manage content, hosted applications, and/or configurations associated with the CPS 150 as well as those associated with separate additional content providers (not illustrated), the EPS 102, and/or a particular client 140. For example, the CPM 157 can manage business process-related content and/or hosted applications on the CPS 150 in response to a received request/response from the EPS 102 and/or client 140. The CPM 157 may be a portal application, a business application, and/or other suitable application consistent with this disclosure. An additional content provider may be, for example, EPS 102 applications and data and/or external services, applications hosted on other servers, databases, RSS feeds, document servers, web servers, streaming servers, caching servers, or other suitable additional content providers. In some implementations, the CPM 157 allows connections to various additional content providers, queries the various additional content providers with regards to provided content, and enables a user to view, add, edit, and/or delete content associated with the CPS 150.

In some implementations, the CPM 157 can use CPM data 164 or other data associated with the example distributed computing system 100a, for example content provider data 114, to perform tasks associated with the CPS 150 and/or other components of the example distributed computing system 100a. CPM data 164 may include any type of data associated with and/or used by the CPM 157, including additional content provider locations, addresses, storage specifications, content lists, minimum technical access requirements, security access requirements, or other suitable data. For example, for a database content provider, the CPM data 164 may include the server Internet Protocol (IP) address, Uniform Resource Locator (URL), access permission requirements, data download speed specifications, etc. Once a particular CPM 157 is launched, the EPS 102 and/or a client 140 may interactively process a task, event, or other information associated with the CPS 150 using content provided by the particular CPM 157.

Additionally, a particular CPM 157 may operate in response to and in connection with at least one request received from other CPMs 157, including a CPM 157 associated with another CPS 150. In some implementations, the CPM 157 can be and/or include a web browser. In some implementations, each CPM 157 can represent a network-based application accessed and executed using the network 130 (e.g., through the Internet, or using at least one cloud-based service associated with the CPM 157). For example, a portion of a particular CPM 157 may be a Web service associated with the CPM 157 that is remotely called, while another portion of the CPM 157 may be an interface object or agent bundled for processing at an EPS 102 and/or a client

140. Moreover, any or all of a particular CPM 157 may be a child or sub-module of another software module or enterprise application (not illustrated) without departing from the scope of this disclosure. Still further, portions of the particular CPM 157 may be executed or accessed by a user working directly at the CPS 150, as well as remotely at a corresponding EPS 102 and/or client 140.

The illustrated example distributed computing system 100a also includes a client 140. The client 140 may be any computing device operable to connect to or communicate with the EPS 102 and/or the CPS 150 using the network 130. In general, the client 140 comprises an electronic computer device operable to receive, transmit, process, and store any appropriate data associated with the example distributed computing system 100a.

The illustrated client 140 further includes a client application 146. The client application 146 is any type of application that allows the client 140 to request, view, edit, and or delete content on the client 140 as well as to interact with the client 140. In some implementations, the client application 146 can be and/or include a web browser. In some implementations, the client-application 146 can use parameters, metadata, and other information received at launch to access a particular set of data, applications, etc. from the EPS 102. Once a particular client application 146 is launched, a user may interactively process a task, event, or other information associated with the EPS 102, including executing the web operating system and associated functionality and viewing, editing, rating, etc. web-based mashups. Further, although illustrated as a single client application 146, the client application 146 may be implemented as multiple client applications in the client 140.

The illustrated client 140 is intended to encompass any computing device such as a desktop computer 140a, laptop/notebook computer 140b, wireless data port, smart phone 140d, personal data assistant (PDA), tablet computing device 140c, one or more processors within these devices, or any other suitable processing device. For example, the client 140 may comprise a computer that includes a camera, an input device, such as a keypad, touch screen, or other device that can accept user information, and an output device that conveys information associated with the operation of the EPS 102 or the client 140 itself, including digital data, visual information, or a GUI 142, as shown with respect to the client 140.

The illustrated client 140 further includes an interface 152, a processor 144, and a memory 148. The interface 152 is used by the client 140 for communicating with other systems in a distributed environment—including within the example distributed computing system 100a—connected to the network 130; for example, the EPS 102 and/or the CPS 150 as well as other systems (not illustrated) communicably coupled to the network 130. The interface 152 may also be consistent with the above-described interface 104 of the EPS 102 and/or interface 154 of the CPS 150 or other interfaces within the example distributed computing system 100a. The processor 144 may be consistent with the above-described processor 105 of the EPS 102 and/or processor 155 of the CPS 150 or other processors within the example distributed computing system 100a. Specifically, the processor 144 executes instructions and manipulates data to perform the operations of the client 140, including the functionality required to send requests to the EPS 102 and/or CPS 150 and to receive and process respective responses. The memory 148 may be consistent with the above-described memory 106 of the EPS 102 and/or memory 156 of the CPS 150 or other memories within the example distributed computing system 100a but storing objects and/or data associated with the purposes of the client 140. Memory 148 may also be used by the EPS 102, CPS 150, and/or other component (not illustrated) of the example distributed computing system 100a to store any type of data for the purposes of the client 140 or of the storing component.

Further, the illustrated client 140 includes a GUI 142. The GUI 142 interfaces with at least a portion of the example distributed computing system 100a for any suitable purpose, including generating a visual representation in a web browser. The GUI 142 may be used to view and navigate various web pages located both internally and externally to the EPS 102 and/or CPS 150 as well as to interact with a particular WOS and all provided data and/or functions. In some implementations, the client application 146 may act as a GUI interface for the EPS 102 and/or the CPS 150. For example, the WOS generated and managed by the WOSE 107, mashup tools managed by the wiring manager 108, the CPM 157, and/or other components of the example distributed computing system 100a. In some implementations, the EPS 102, CPS 150, and/or other components of the example distributed computing system 100a can transmit executable components to the client application 146 for analysis and execution on the client 140, for example out-of-box/hosted application code, and/or provide content to the client application 146 for display, for example the results of a hosted application executing on the CPS 150 and/or an out-of-box application/mashup executing on the EPS 102.

There may be any number of clients 140 associated with, or external to, the example distributed computing system 100a. For example, while the illustrated example distributed computing system 100a includes one client 140 communicably coupled to the EPS 102 using network 130, alternative implementations of the example distributed computing system 100a may include any number of clients 140 suitable to the purposes of the example distributed computing system 100a. Additionally, there may also be one or more additional clients 140 external to the illustrated portion of the example distributed computing system 100a that are capable of interacting with the example distributed computing system 100a using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

FIG. 1B is a block diagram illustrating an example distributed computing system 100b for providing a web-based operating system framework for client devices according to one implementation. FIG. 1B illustrates a non-cloud-computing-based implementation where components of the CPS 150 are associated with/integrated within the EPS 102 which provides content, a WOS, mashup functionality, and/or or access to both out-of-box and hosted applications for the client 140. The description and functionality of the components associated with the EPS 102, network 130, and/or client 140 are identical or almost identical to the equivalent component descriptions associated with the above-described FIG. 1A except that communication between components of the example distributed computing system 100b takes place within and/or between the EPS 102 and/or the client 140 using the network 130. Those of skill in the art will understand any necessary modifications required for the components of the example distributed computing system 100a to operate in this configuration. This configuration and other intermediate configurations between the example implementations illustrated in FIGS. 1A and 1B are envisioned to be within the scope of this disclosure.

FIG. 2 illustrates an example screenshot 200 of a web operating system (WOS) home page 202 with associated web applications according to one implementation. Once an EP user logs in to the EP, for example through a web-based EP login screen in the client 140's native browser application, the WOSE 107 determines whether the EP user is to be presented with the WOS GUI interface. This determination can be made by analyzing user configuration data (not illustrated) stored the client 140 and/or the EPS 102. The EP user may also be presented immediately after login with a dialog requesting the EP user to decide which GUI interface to display. In some implementations, the choice of whether to display a WOS GUI also depends on EP administrator settings, user permission level, applications to access for a specific task/function, etc.

The available applications for a specific EP user can be dependent upon permission level, role, group, etc. In some implementations, the WOSE 107 can access user configuration data (not illustrated) stored the client 140 and/or the EPS 102 to determine what applications are available to the EP user, what default configuration they are in at login, whether any custom configuration to the WOS needs to be performed, and the like. The WOSE 107 can also check the availability of both out-of-box applications 118 and/or hosted applications 168 indicated to be displayed on the WOS. For example, if a hosted application 168 is not locally hosted on the EPS 102, the WOSE 107 can communicate with the CPS 157 to determine availability of the hosted application 168, the hosted application configuration 170, etc. In some implementations, application versions may have changed and the EP user can be prompted by the WOSE 107 as to whether they wish to update the applications to a current version.

WOS is presented in this example in a native browser tab 204 to the user as the interface to interact with the EP. In some implementations, the EP user has GUI options (not illustrated) to transition between a "traditional" web page based EP portal GUI design and the WOS. Note that there are multiple home pages 202 available to the EP user as indicated by page count indicator 206 that may be accessed by "swiping" the screen using a digit, stylus, GUI pointing device such as a mouse, etc. Available web applications, for example "CSN Graph" 208 and "Mail" 210 are displayed on the home pages and can be activated by selecting the appropriate icon to start the application. In some implementations (not illustrated), the icon may indicated graphically whether it is a hosted application 168 or an out-of-box application 116. For example, the icon may have a small indicator in an upper corner, be a different color, be surrounded by a particular border, etc. The home page 200 also contains a search button 212 but also may contain other non-illustrated functional buttons and GUI elements consistent with this disclosure.

In some implementations, the WOS may emulate the native operating system GUI of the host client device, a non-native operating system GUI, or a combination to provide for similar functionality of the host device or any other device for flexibility and familiarity. For example, the WOS could emulate the ANDROID operating system GUI as well as incorporating various features found only in the APPLE IOS operating system GUI to create a combination WOS experience for the EP user. Which WOS configuration can be determined by analyzing user configuration data (not illustrated) stored the client 140 and/or the EPS 102, administrator settings, querying the EP user, and the like.

Figure 3A:
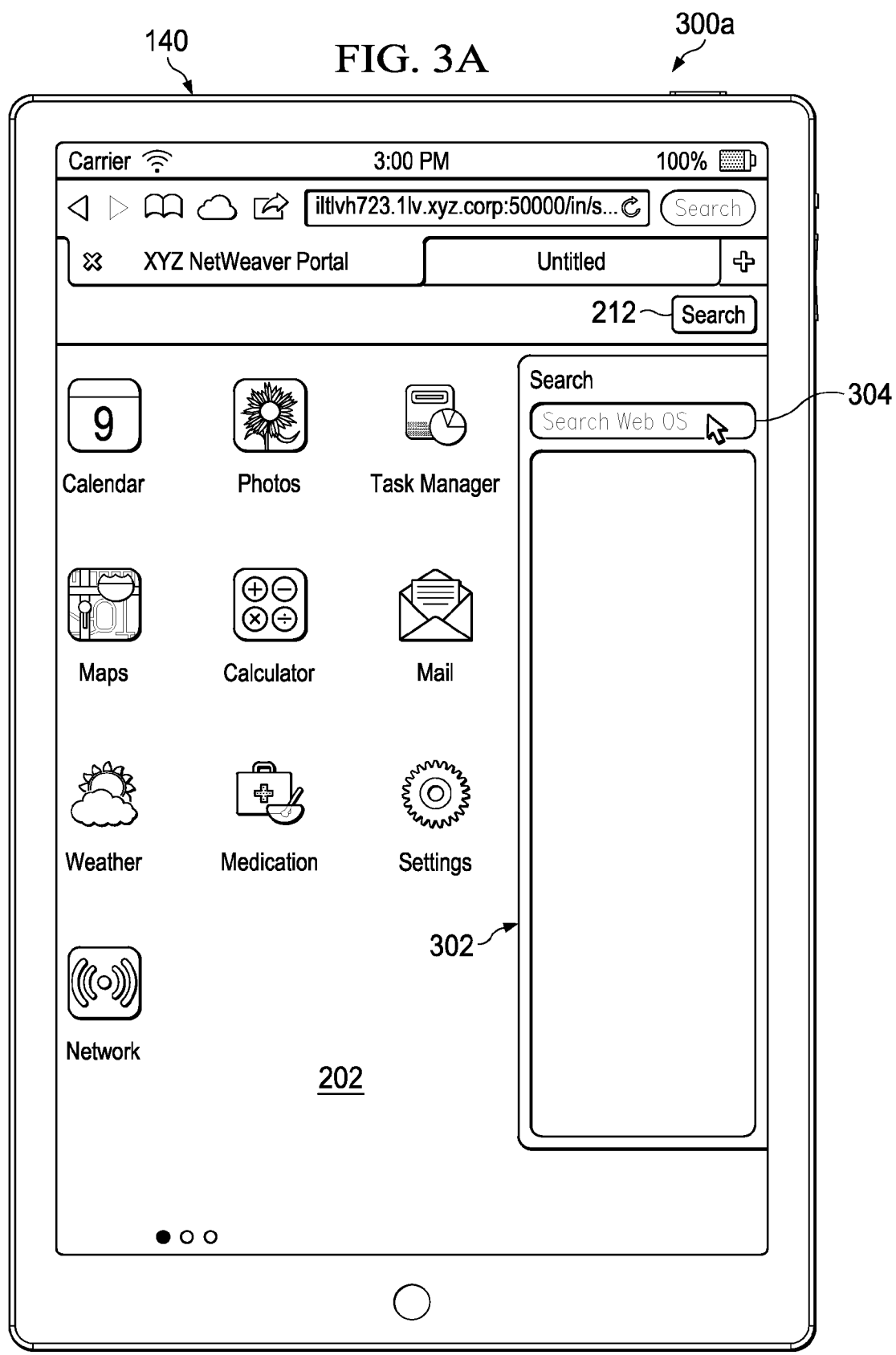
FIG. 3A illustrates an example screenshot of a search functionality box according to one implementation.

FIG. 3A illustrates an example screenshot 300a of a search functionality box according to one implementation. If the EP user selects the search button 212, a search panel 302 appears for search term entry into search box 304. Note that in some implementations, the entire WOS home page 202 is displaced (e.g., to the left) off the screen by the addition of the search panel 214.

Figure 3B:
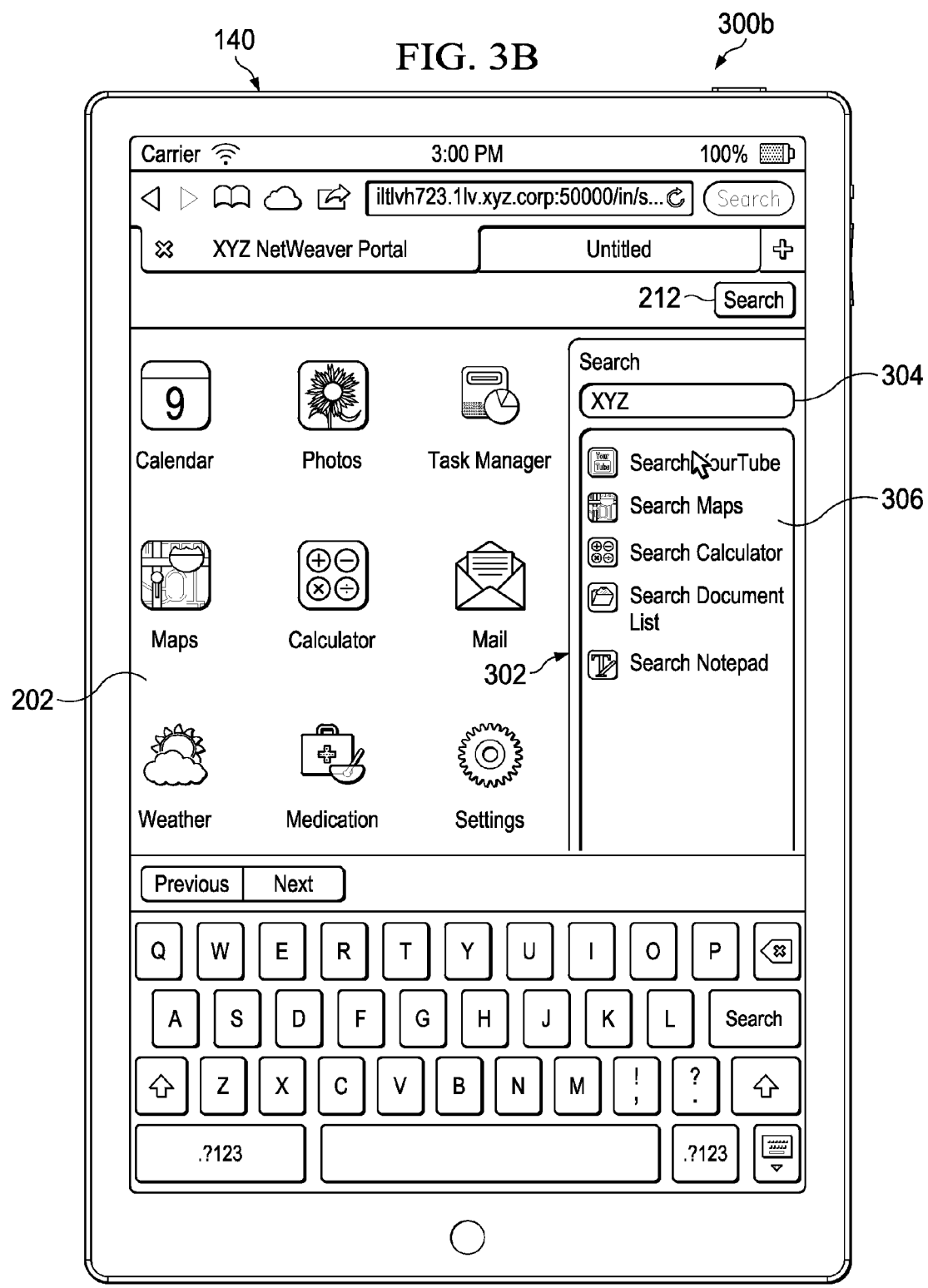
FIG. 3B illustrates an example screenshot of dynamic results populated while typing a search keyword into the search panel search box according to one implementation.

FIG. 3B illustrates an example screenshot 300b of dynamic results populated while typing a search keyword into the search panel 302 search box 304 according to one implementation. The EP user can type one or more search terms, including wildcards and special characters associated with search functionality into the search box 304 to trigger an automatic search. In some implementations, the EP user would select a GUI element (not illustrated to start the search function). In some implementations, as the EP user types search terms, dynamic search results are display in the search results field 306. Here, five results have displayed after typing "XYZ" into the search box 304 providing contextual searching of available applications, for example, "Search YouTube." If the EP user selects this search option, the "YouTube" application is opened and a search performed by search functionality associated with the listed application. The "YouTube" application was displayed in the search results, because in some implementations, the "YouTube" application configuration identified that search functionality was associated with this application and this information was analyzed, for example by the WOSE 107 when generating the WOS.

Figure 3C:
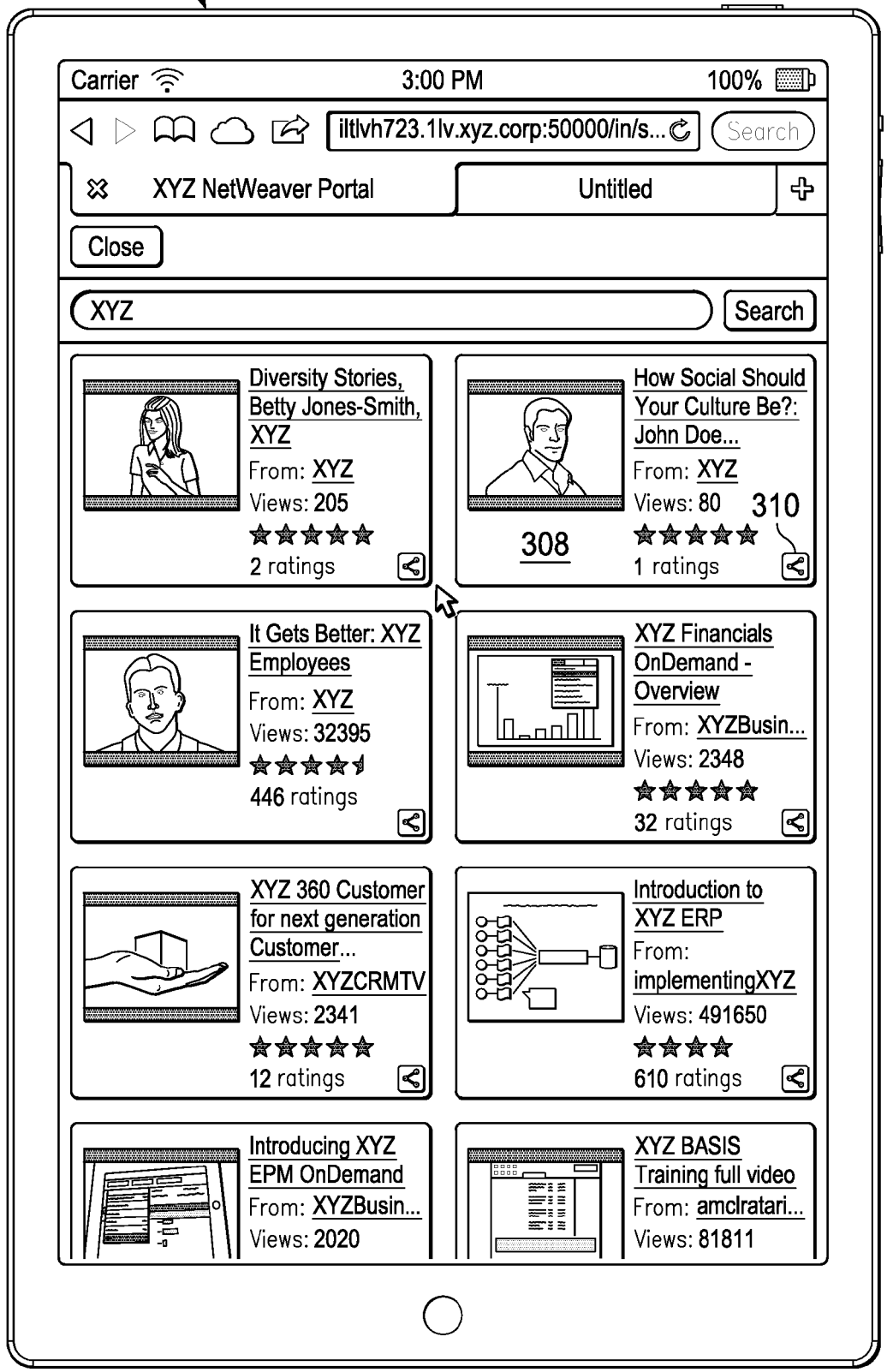
FIG. 3C illustrates an example screenshot of search results presented to a user after selecting the "Search YouTube" dynamic result in FIG. 3B according to one implementation.

FIG. 3C illustrates an example screenshot 300c of search results presented to a user after selecting the "Search YouTube" dynamic result in FIG. 3B according to one implementation. After selecting the "Search YouTube" dynamic result, the EP user is presented with the "YouTube" application GUI 308 with contextual results for the search for "XYZ." The "YouTube" application was passed at least the search term "XYZ" and an internal search was performed by the "YouTube" application prior, during, or after the opening of the "YouTube" application to present the contextual search results to the user in the application GUI 308. It should be noted that each search result has a "share" functionality GUI element 310 associated with it. In some implementations, this functionality and/or appropriate sharing targets are indicated in the application configuration. In other implementations, the search results can have one or more embedded properties to provide data for a desired functionality and/or share targets.

Figure 4A:
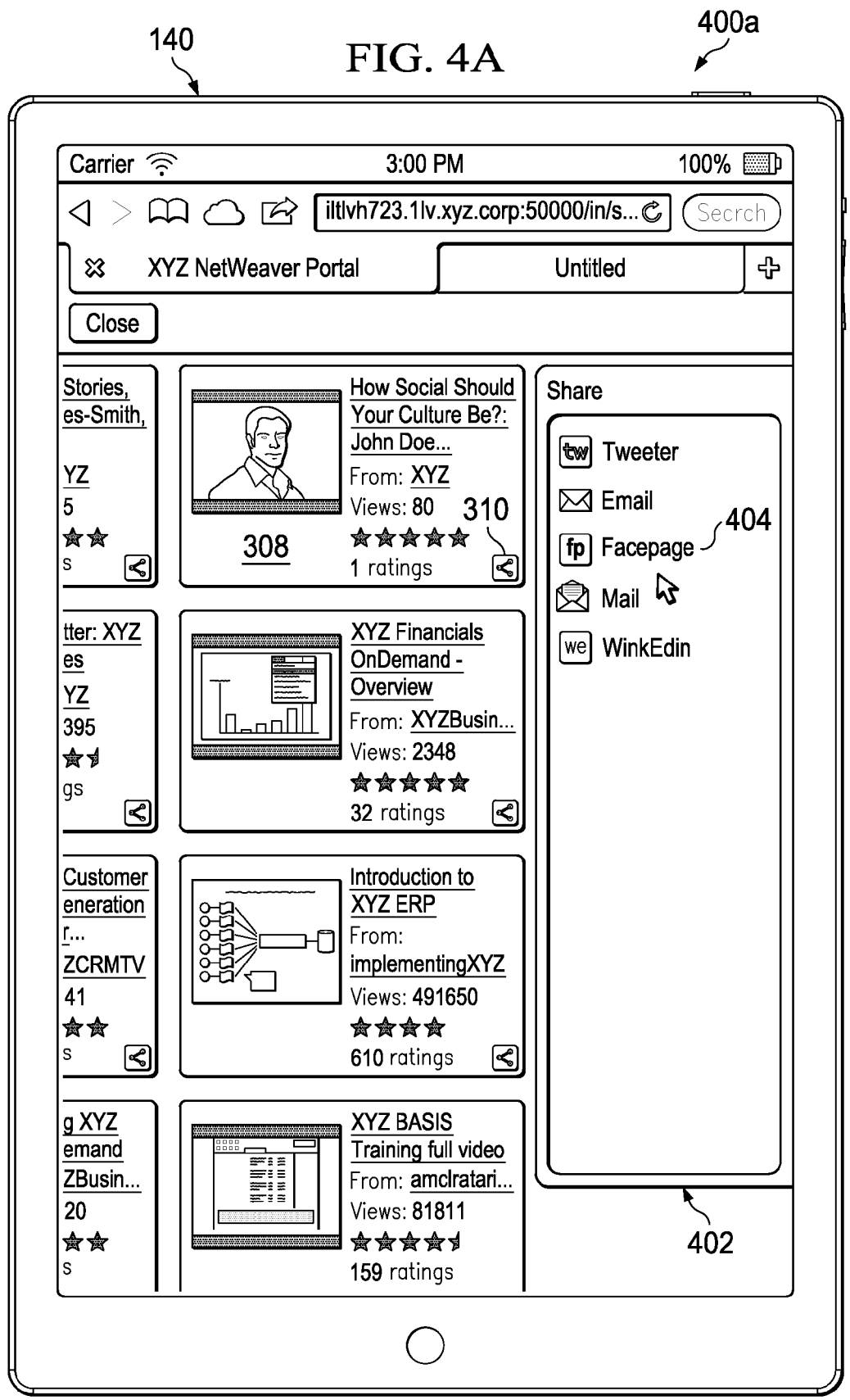
FIG. 4A illustrates an example screenshot of a share functionality box according to one implementation.

FIG. 4A illustrates an example screenshot 400a of a share functionality box according to one implementation. If the EP user selects the "share" GUI element button 310, a share panel 402 appears for share target selection of a number of share targets 404. Although the illustrated share target 404 list is predetermined, in some implementations, the EP user can have the option (not illustrated) to type in a custom share target. Note again that in some implementations, the entire application GUI 308 is displaced (e.g., to the left) off the screen by the addition of the share panel 402.

Figure 4B:
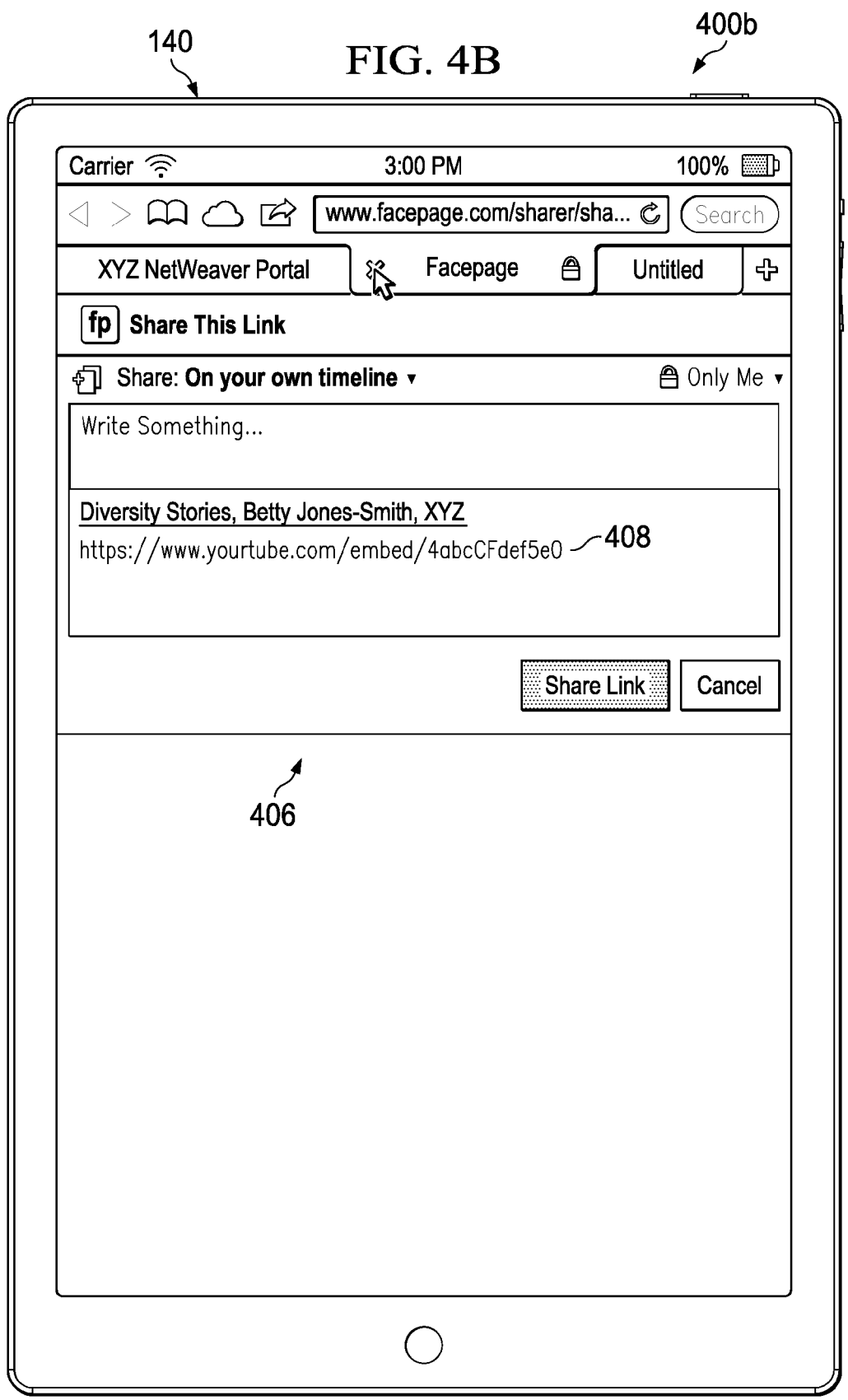
FIG. 4B illustrates an example screenshot of a FACEBOOK interface screen for sharing data presented to an user after selecting the "Facebook" sharing option in FIG. 4A according to one implementation.

FIG. 4B illustrates an example screenshot 400b of a FACEBOOK interface screen 406 for sharing data presented to an user after selecting the "Facebook" sharing option in FIG. 4A according to one implementation. Here, the link 408 associated with the search result 308 has been populated to share within the selected "Facebook" application due to the EP user's selection of the "Facebook" application in the share target list 404.

FIG. 5 illustrates an example screenshot 500 of drag-and-drop functionality for web application icons on the WOS homepage according to one implementation. The EP user has selected application icon 502 for a drag-and-drop operation on the WOS homepage 202. In some implementations, the application icons can be placed into an edit mode allowing drag-and-drop, deletion (as indicated by the "X" at 504) folder creation, home page rearrangement, icon resizing, and other suitable operations. Here the "Medication" application icon 502 is shown being dragged from its position to an alternate position on the WOS homepage 202 (see the upper left corner of FIG. 6A for the relocated icon 502).

Figure 6A:
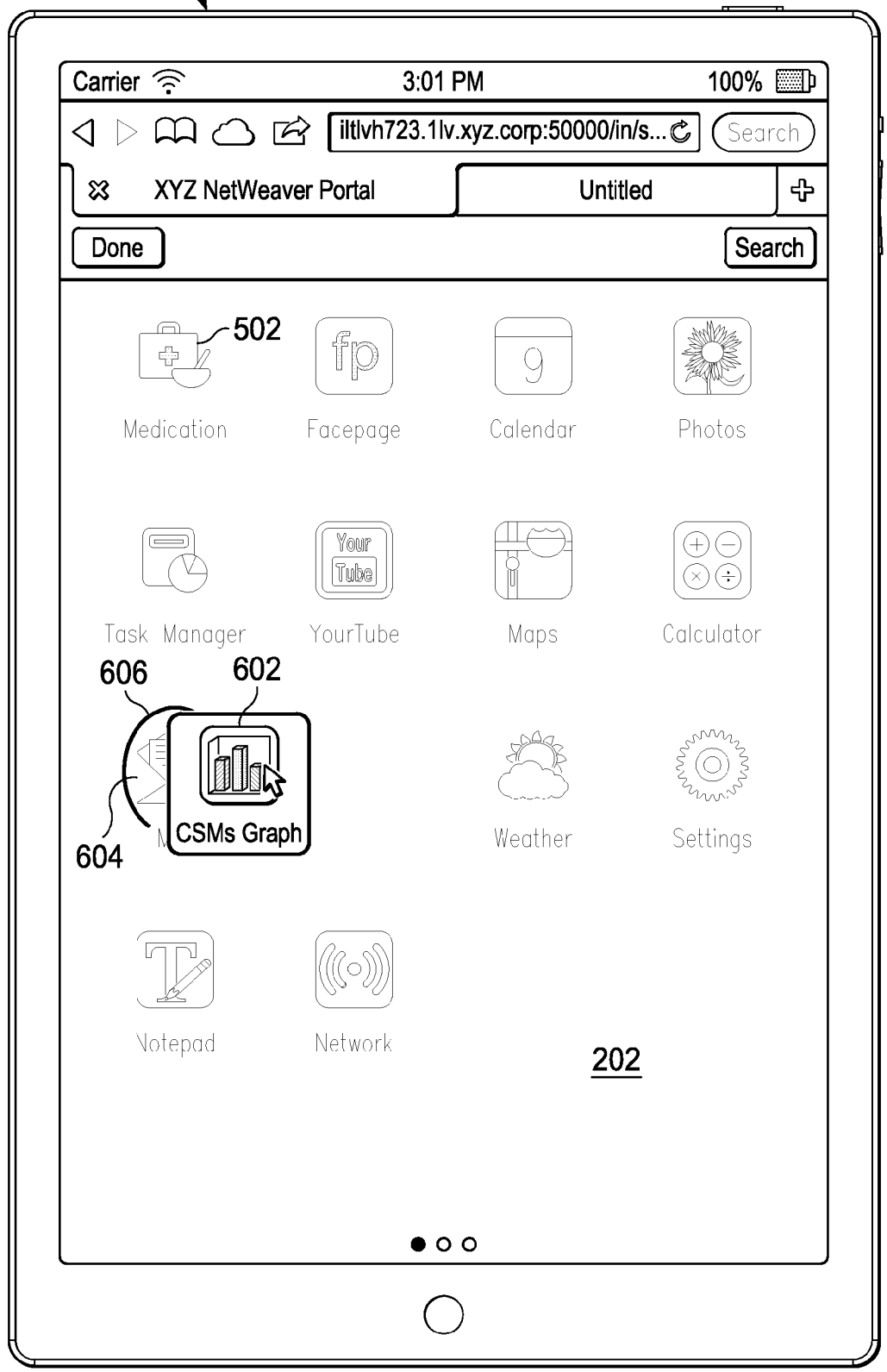
FIG. 6A illustrates an example screenshot of dropping a web application icon on top of another web application icon to initiate a web application mashup according to one implementation.

FIG. 6A illustrates an example screenshot of dropping a web application icon on top of another web application icon to initiate a web application mashup according to one implementation. Here the "CSN Graph" icon 602 has been dragged over the top of the "Mail" icon 602. In some implementations, this action indicates to the WOSE 107 and/or the wiring manager 108 that a mashup is desired by the EP use between the "CSN Graph" and the "Mail" applications. Note that the "target" application icon (here the "Mail" application indicated by icon 604) has changed to display an exterior round border 606 around the top of the "Mail" application icon 604 to indicate that a mashup creation action is being initiated. This border is only representative of many possible graphical indications of a mashup and is not intended to limit graphical response to a mashup request in any way.

FIG. 6B illustrates an example screenshot 600b of a layout manager displayed to format a requested web application mashup according to one implementation. Here the "CSN Graph" icon 602 has been included as part of a layout manager 608 associated with the mashup indication icon 604/606. Note that while in this example the "Mail" icon 602/application is considered a "target" for the purposes of the mashup in that the "CSN Graph" icon 602/application is being added to the "Mail" application, in other implementations, either application can be considered equivalent for any purposes regardless drag-and-drop order, etc. The layout manager 608 indicates default available layouts, for example layout 610 that can be used to organize the mashup visually. In some implementations, there can be standard GUI options/tools (not illustrated) for the EP user to generate custom layouts for use with mashups. These options/tool can be accessible from the layout manager 608, for example through the selection of a GUI element, link, or the like. In some implementations, the layout manager may not be available to an EP user depending upon user security settings, role, location, or other suitable value. In these instances, a dialog can appear notifying the EP user that they are not capable of creating the desired mashup. In some implementations, specific applications may not be allowed to be used in a mashup and an attempt to create a mashup would result in an appropriate notification to the EP user of this fact.

In some implementations, mashups may be made available for the EP user's personal use and/or other EP users. For example, an EP user may wish that a created mashup is only available for their use and can select an option (not illustrated) on the layout manager to indicate private access. In another example, the EP user, for example an administrator or group leader, can indicate that a created mashup is to be available to specific other individuals, their group, and/or all EP users.

FIG. 6C illustrates an example screenshot 600c of a layout manager position indication for a web application according to one implementation. Note that as the EP user drags the "CSN Graph" icon 602 onto the layout 610, that layout "panels", for example panel 612, are graphically indicated, here by highlighting a different color, pattern, shading, etc. as the location the "CSN Graph" icon 602/application will be associated with if "released" by the EP user from the drag-and-drop operation.

FIG. 6D illustrates an example screenshot 600d of a layout manager with a second web application dynamically inserted into a layout position according to one implementation. Here the "CSN Graph" icon 602 has been released into panel 612 by the EP user and is indicated as associated with the panel 612. In some implementations, multiple icons/applications can be associated with a single panel and the resulting applications can be graphically delineated when executed. Note that the "Mail" icon/application 604 is associated with the top panel 614 of layout 610. In some implementations, application configurations can specify default panel associations, a panel association can be dynamically calculated by the wiring manager 108 or any other suitable component of the example distributed computing system 100a/100b, and/or the EP user can specify where the "target" icon/application should also be situation within a chosen mashup layout. Also, the mashup indication icon 606 has changed to reflect in miniature the chosen mashup layout 610 and icons within the mashup indication icon 606 are added to reflect the two icons 602/604 associated to create the mashup in their current mashup layout positions. In some implementations, the EP user can move the positions of the applications within the mashup layout and these changes will be dynamically reflected in the mashup indication icon 606. The EP user an then select the "Done" button 615 to close the layout manager. In some implementations, additional tools, for example wiring tools, can be initiated from the layout manager to further refine mashup wiring between applications. Refining mashup wiring may include data flow, data types, data conversion, functionality, mashup descriptions, etc.

Figure 6E:
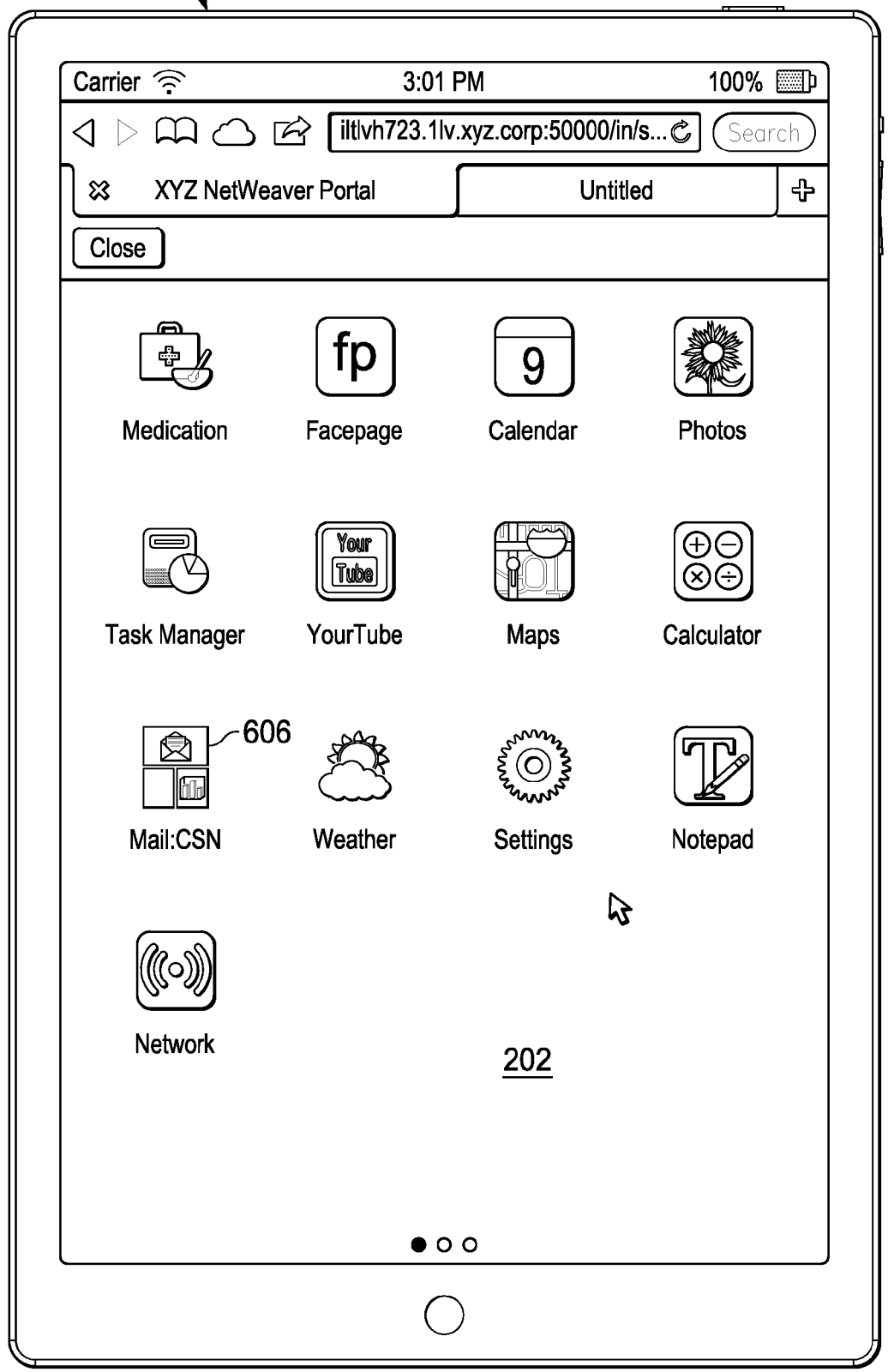
FIG. 6E illustrates an example screenshot of a created mashup web application icon on the WOS home page with two associated web applications according to one implementation.

FIG. 6E illustrates an example screenshot 600e of a created mashup web application icon on the WOS home page with two associated web applications according to one implementation. Here, the mashup indication icon 606 has changed on the WOS homepage 202 to reflect the current mashup between the "CSN Graph" icon 602/application and "Mail" icon/application 604 using layout 610. In this implementation, the mashup indication icon has a label of "Mail: CSN" to reflect the mashup, but this label could reflect any suitable value to indicate a mashup or for any other purpose. In some implementations, the original "CSN Graph" icon 602 and "Mail" icon 604 can still be available on the WOS homepage 202 for EP user access to the individual applications in a non-mashup configuration.

FIG. 6F illustrates an example screenshot 600f of adding a third web application to the mashup web application of FIG. 6E according to one implementation. Here the "Member List" icon 616/application has been selected to add to the current mashup indicated by mashup indication icon 606. As in the previous example, the "Member List" icon 616 could have been dragged and dropped onto the mashup indication icon 606 to trigger the layout manager.

Figure 6G:
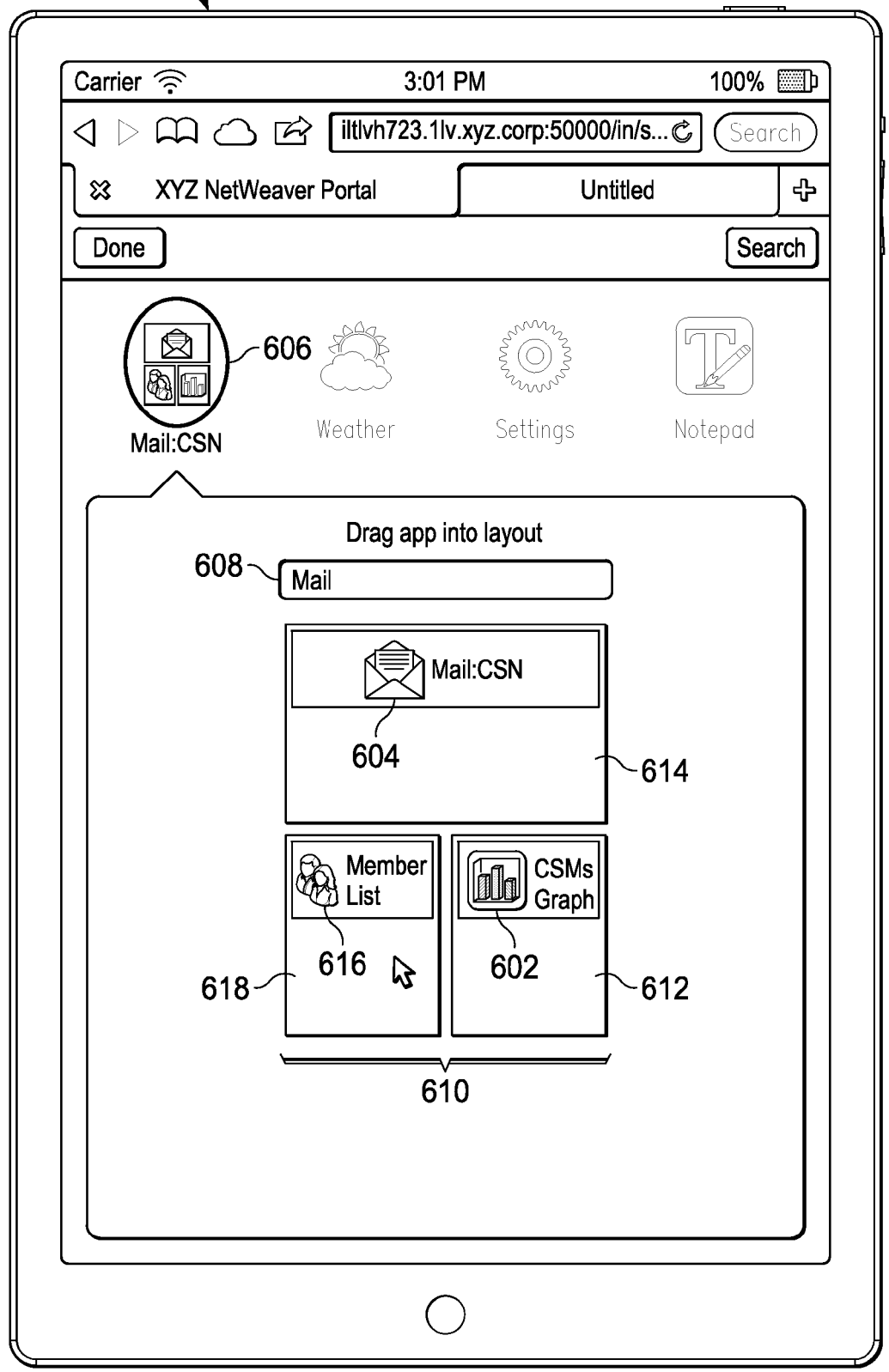
FIG. 6G illustrates an example screenshot of a layout manager with three web applications in position as part of a web application mashup according to one implementation.

FIG. 6G illustrates an example screenshot 600g of a layout manager with three web applications in position as part of a web application mashup according to one implementation. Here, the "Member List" icon 616/application has been added to the left layout panel 618. The mashup indication icon 606 has also changed to reflect the addition of the new application to the mashup.

Figure 6H:
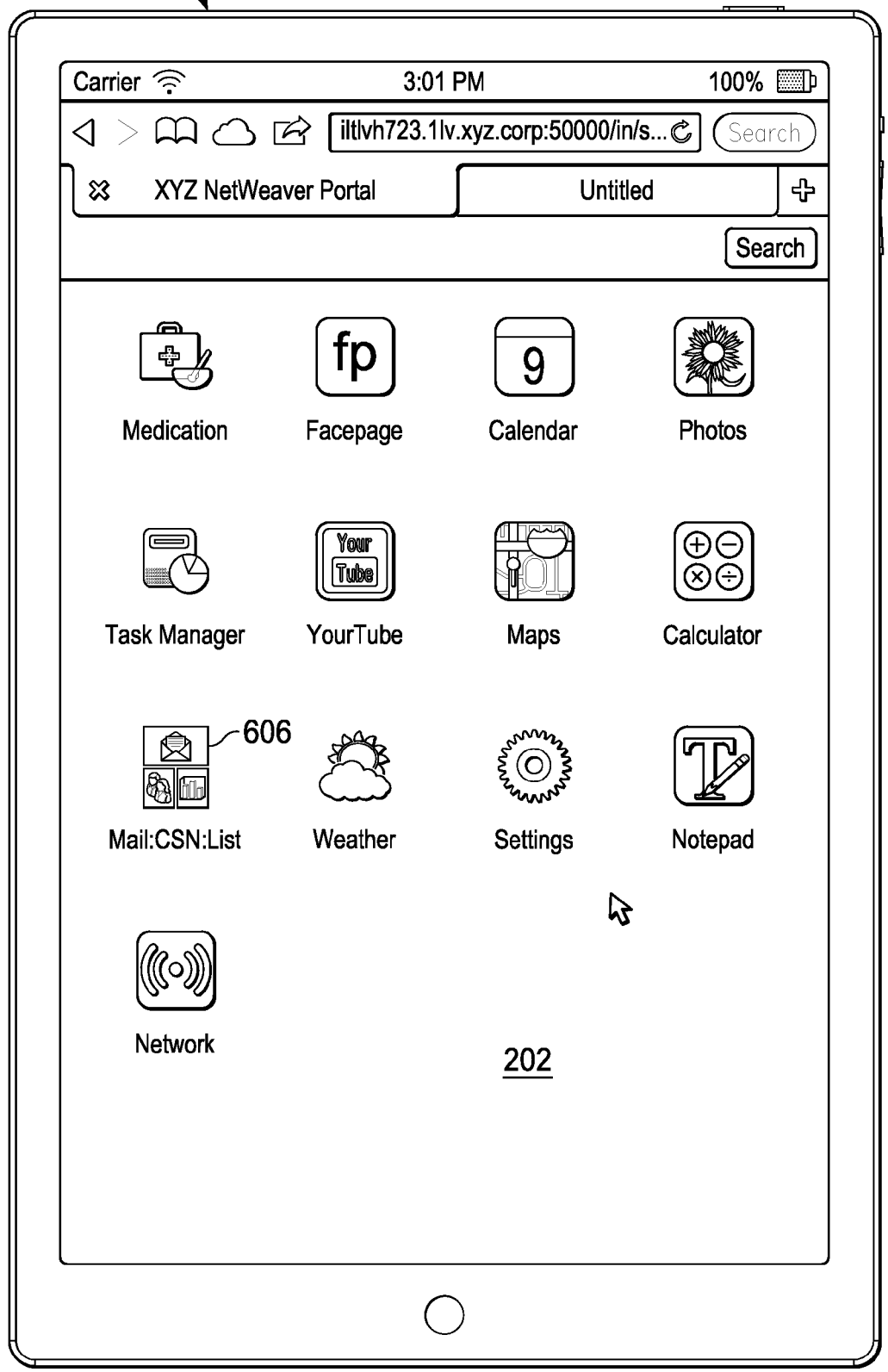
FIG. 6H illustrates an example screenshot of an updated mashup web application icon on the WOS home page with three associated web applications according to one implementation.

FIG. 6H illustrates an example screenshot 600h of an updated mashup web application icon on the WOS home page with three associated web applications according to one implementation. Here, the mashup indication icon 606 has changed on the WOS homepage 202 to reflect the current mashup between the "CSN Graph" icon 602/application, "Mail" icon/application 604 and "Member List" icon 616/application using layout 610. In this implementation, the mashup indication icon has a label of "Mail:CSN:List" to reflect the mashup, but this label could reflect any suitable value to indicate a mashup or for any other purpose.

Figure 7A:
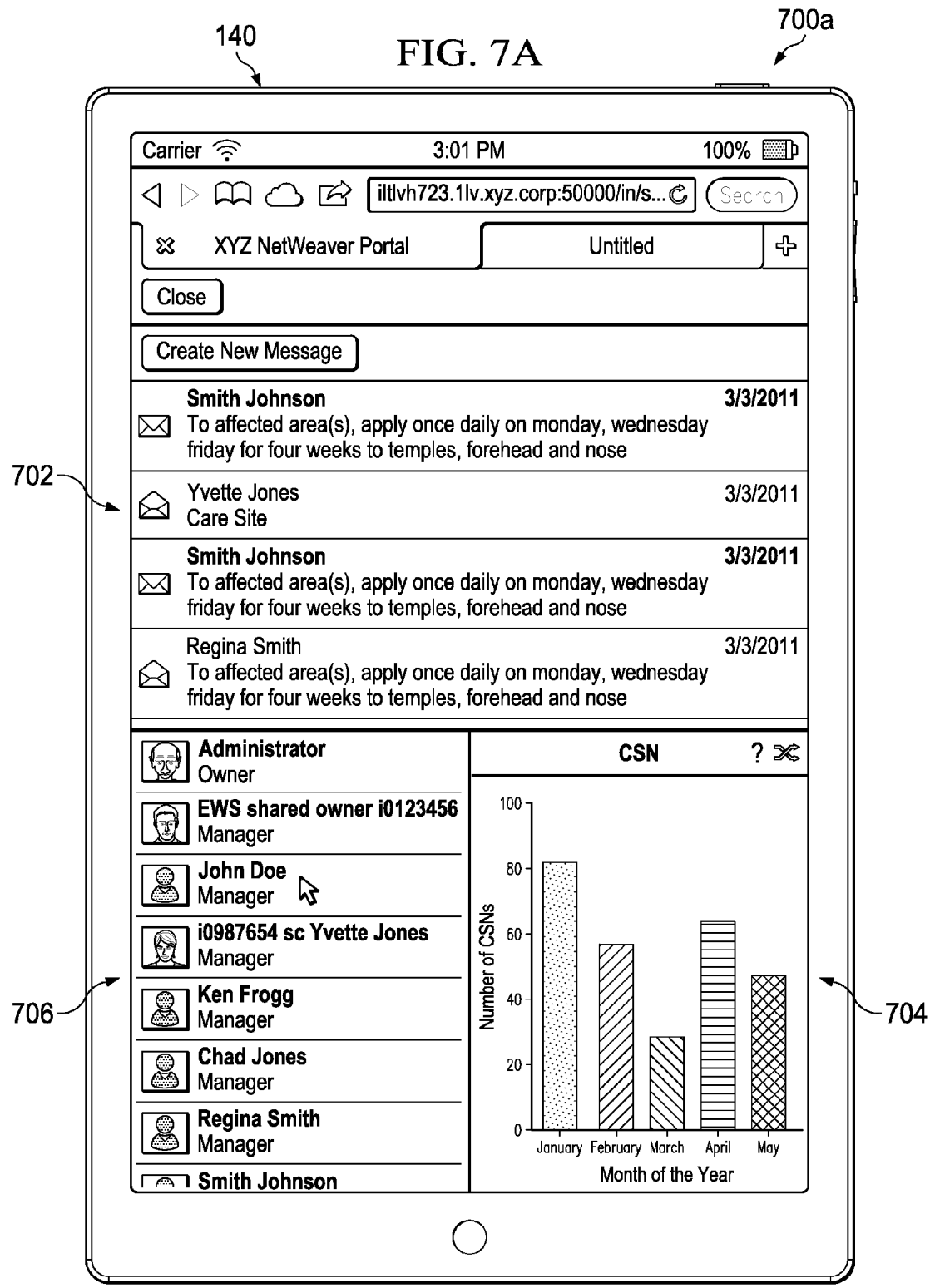
FIG. 7A illustrates an example screenshot of an executing web application mashup with default values according to one implementation.

FIG. 7A illustrates an example screenshot 700*a* of an executing web application mashup with default values according to one implementation. Here the "Mail" 702, "CSN Graph" 704, and "Member List" 706 applications are illustrated executing in a mashup layout as previously defined with the layout manager in FIGS. 6A-6H. In this example, each application is displaying default values, that is, no selection has been made of a value in either application to trigger changes in the other associated applications.

Figure 7B:
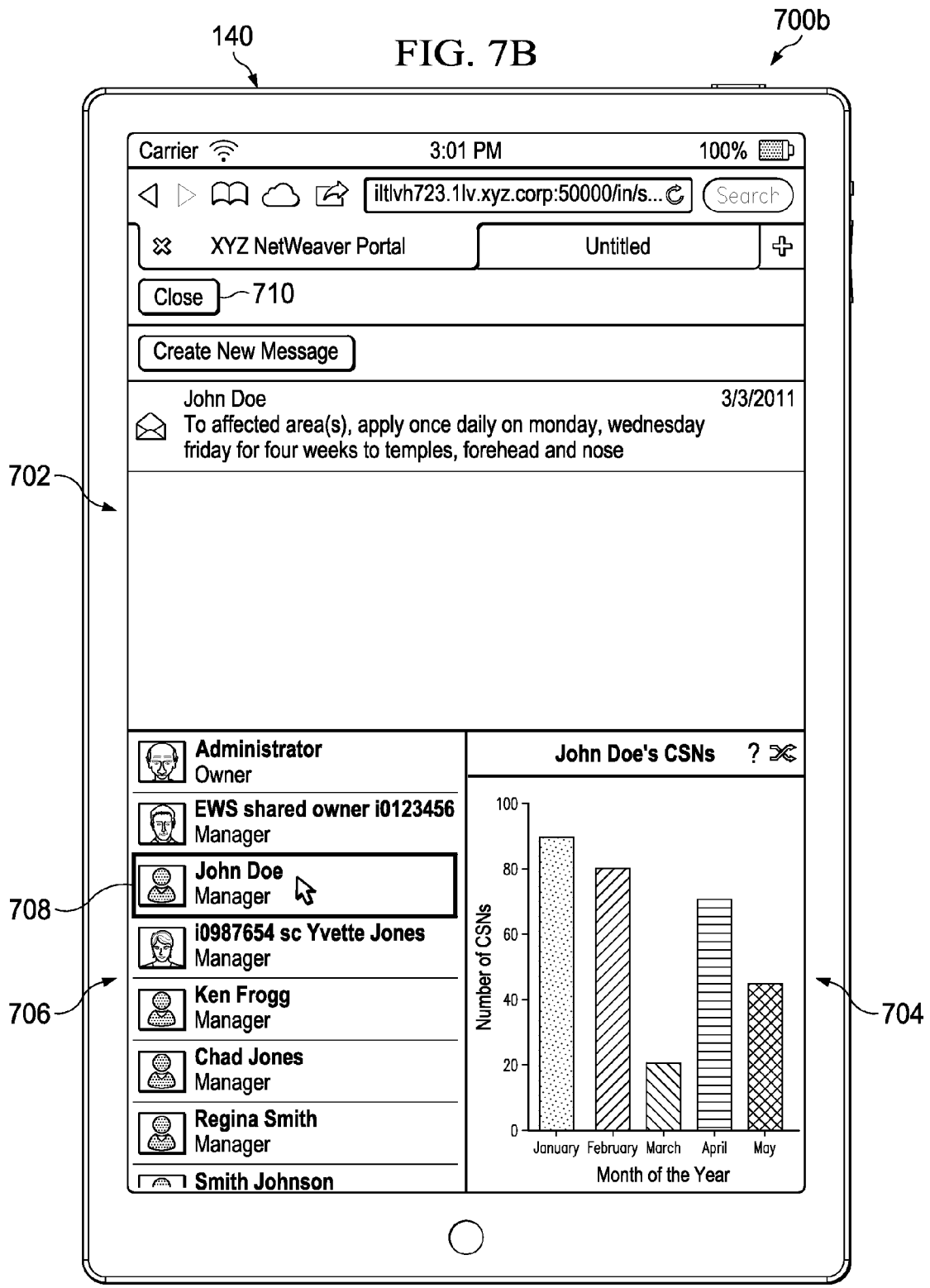
FIG. 7B illustrates an example screenshot of an executing web application mashup with values reflecting a selection made in the web application mashup according to one implementation.

FIG. 7B illustrates an example screenshot 700*b* of an executing web application mashup with values reflecting a selection made in the web application mashup according to one implementation. Note here that "Member List" 706 entry "Guy Roth" 708 has been selected. As a result, the wired together "Mail" 702 and "CSN Graph" 704 applications adjust their values to reflect data relevant to "Guy Roth." In some implementations, it can also be possible to select, for example, a graph bar in the "CSN Graph" 704 application or an email message in the "Mail" 702 applications to trigger the other associated applications to reflect associated data with the selected value(s). The EP user can select the "Close" button 710 to close the mashup.

FIG. 8 is a flow chart of an example method 800 for providing a web-based operating system framework for client devices. For clarity of presentation, the description that follows generally describes method 800 in the context of FIGS. 1A-1B, 2, 3A-3C, 4A-4B, 5, 6A-6H, and 7A-7B. However, it will be understood that method 800 may be performed, for example, by any other suitable system, environment, software, and hardware, or a combination of systems, environments, software, and hardware as appropriate.

At 802, the EP receives EP user login credentials from a client device. The login credentials are analyzed by the EPS. In some implementations, specific user configuration data associated with the EP user is accessed for web operating system (WOS) configuration reasons. From 802, method 800 proceeds to 804.

At 804, the EPS analyzes the user configuration to determine the EP user's desired GUI for the enterprise portal to display on the client device. From 804, method 800 proceeds to 806.

At 806, a determination is made whether to present the WOS GUI. If at 806, it is determined to present the WOS GUI, method 800 proceeds to 810. If at 806, it is determined not to present the WOS GUI, method 800 proceeds to 808. After 808, method 800 stops.

At 810, the WOSE determines a WOS configuration to display to the EP user. In some implementations, the WOSE can access user configuration data, mirror as closely as possible the client device native operating system GUI, follow administrative settings, historical data reflecting prior EP user choices/WOSE determinations, and the like to perform the determination. From 810, method 800 proceeds to 812.

At 812, the WOSE displays the determined WOS GUI configuration. From 812, method 800 proceeds to 814.

At 814, the WOSE determines the availability of an application for the determined WOS GUI configuration. In some implementations, the wiring manager and/or other suitable component of the example distributed computing system can perform this determination. Some applications may not be available for certain WOS GUI configurations or may run with limited functionality under particular WOS GUI configurations. From 814, method 800 proceeds to 816.

At 816, a determination is made whether the application is available. If at 816 it is determined that the application is available, method 800 proceeds to 818. If at 816 it is determined that the application is not available, method 800 proceeds to 820.

At 818, the WOSE displays the application's icon or other graphical representation in the WOS GUI for EP user interaction. From 818, method 800 proceeds to 820.

At 820, it is determined whether the application has an available update. The WOSE, wiring manager, and/or other suitable component of the example distributed computing system can communicate with the CPS and/or analyze appropriate data on the EPS to make the determination. From 820, method 800 proceeds to 822.

At 822, a determination is made whether the application is to be updated. In some implementations, the EP user can be presented with a dialog or other indication that an update is available for the application. If at 822 it is determined that the application is to be updated, method 800 proceeds to 824. If at 822 it is determined that the application is not to be updated, method 800 proceeds to 826.

At 824, the application is updated. In some implementations, the updated application code is downloaded and installed from the CPS and/or the EPS. From 824, method 800 proceeds to 826.

At 826, the WOSE and/or the wiring manager monitors GUI interactions associated with the WOS. From 826, method 800 proceeds to 828.

At 828, the WOSE, wiring manager, and/or other suitable component of the example distributed computing system performs appropriate functionality based upon EP user GUI interactions. For example, functionality can include searching, sharing, drag-and-drop of application icons, deletion of application icons, rearrangement of application icons; indicating to start a mashup process, configure mashup settings, view available mashups, edit available mashups, and other suitable functions consistent with this disclosure. From 828, method 800 proceeds back to 826.

Although the disclosure describes the example distributed computing system 100*a*/100*b* in terms of an enterprise portal, those skilled in the art will appreciate the applicability of the disclosure to other suitable systems without departing from the scope of the disclosure. One possible example includes a non-enterprise portal software development system or other system. The disclosure is not meant to limit the applicability of the disclosure in any way to portals or similar content aggregation and/or content delivery systems.

While the disclosure discusses applications/web-applications, the scope of the disclosure is not limited to applications/web-applications. As will be appreciated by those of skill in the art and consistent with the scope of this disclosure, other entities, for example hardware entities, can be subjected to wiring/mashup operations and presented in a networked relationship form.

While, FIGS. 2, 3A-3C, 4A-4B, 5, 6A-6H, and 7A-7B illustrate and describe various example GUIs, these example GUIs are meant only as representative examples of many possible implementations and are not meant to limit in any way GUI functionality and implementations for providing a web-based operating system framework for client devices. Those of skill in the art will appreciate the multitude of possible implementations that may be used to accomplish the described functionality.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
receiving portal login credentials from a client device;
analyzing, by operation of a computer, configuration data to determine a desired graphical user interface (GUI) for the portal to present on the client device;
determining to present a particular web operating system (WOS) GUI configuration on the client device;
displaying a plurality of graphical elements representing a set of available applications on the determined WOS GUI configuration;
monitoring the WOS for GUI interactions associated with the graphical element, wherein the monitoring includes:
identifying user selection of a first graphical element from the plurality of graphical elements, wherein the first graphical element represents a first available application;
receiving user input representing dragging of the first graphical element onto a second graphical element from the plurality of graphical elements, wherein the second graphical element is different than the first graphical element and wherein the second graphical element represents a second available application;
in response to receiving the user dragging input of the first graphical element onto the second graphical element, displaying a plurality of mashup layouts available for application mashup operation between the first and second available applications, wherein each of the displayed plurality of mashup layouts provides a graphical preview representing a particular mashup of the first and second available applications; and
receiving user input identifying user selection of a mashup layout from the displayed plurality of mashup layouts; and
in response to the monitored GUI interactions:
initiating an application mashup operation between the first and second available applications;

dynamically calculating positions of the first and the second graphical elements associated with the first and second available applications in the selected mashup layout; and displaying an updated graphical element representing a mashup of the first and second available applications, wherein the updated graphical element replaces the second graphical element displayed on the WOS GUI configuration and wherein the updated graphical element reflects in miniature the first and second graphical elements arranged at the calculated positions in the selected mashup layout.

2. The computer-implemented method of claim 1, wherein the determination of the particular WOS GUI configuration to present on the client device is based upon one of the client device type, the configuration data, portal administrator settings, or historical data.

3. The computer implemented method of claim 2, wherein the particular WOS GUI configuration is one or more of a reflection of the client device's native operating system GUI, a GUI interface of a particular operating system not native to the client device, or a combination of the client device's native operating system GUI and the particular operating system GUI not native to the client device.

4. The computer implemented method of claim 1, further comprising determining an availability of the application for the determined WOS GUI interface configuration.

5. The computer implemented method of claim 1, further comprising determining whether the application has an available update.

6. The computer-implemented method of claim 1, wherein the set of available applications is determined based on the analyzed configuration data.

7. A non-transitory, computer-readable medium storing computer instructions executable by a data processing apparatus to perform operations comprising:

receiving portal login credentials from a client device;

analyzing configuration data to determine a desired graphical user interface (GUI) for the portal to present on the client device;

determining to present a particular web operating system (WOS) GUI configuration on the client device;

determining an availability of a set of applications for the determined WOS GUI configuration;

displaying a plurality of graphical elements representing the determined set of available applications on the determined WOS GUI configuration;

monitoring the WOS for GUI interactions associated with the graphical element, wherein the monitoring includes:

identifying user selection of a first graphical element from the plurality of graphical elements, wherein the first graphical element represents a first available application;

receiving user input representing dragging of the first graphical element onto a second graphical element from the plurality of graphical elements, wherein the second graphical element is different than the first graphical element and wherein the second graphical element represents a second available application;

in response to receiving the user dragging input of the first graphical element onto the second graphical element, displaying a plurality of mashup layouts available for application mashup operation between the first and second available applications, wherein each of the displayed plurality of mashup layouts provides a graphical preview representing a particular mashup of the first and second available applications; and receiving user input identifying user selection of a mashup layout from the displayed plurality of mashup layouts; and in response to the monitored GUI interactions:

initiating an application mashup operation between the first and second available applications;

dynamically calculating positions of the first and the second graphical elements associated with the first and second available applications in the selected mashup layout; and displaying an updated graphical element representing a mashup of the first and second available applications, wherein the updated graphical element replaces the second graphical element displayed on the WOS GUI configuration and wherein the updated graphical element reflects in miniature the first and second graphical elements arranged at the calculated positions in the selected mashup layout.

8. The medium of claim 7, wherein the determination of the particular WOS GUI configuration to present on the client device is based upon one of the client device type, the configuration data, portal administrator settings, or historical data.

9. The medium of claim 8, wherein the particular WOS GUI configuration is one or more of a reflection of the client device's native operating system GUI, a GUI interface of a particular operating system not native to the client device, or a combination of the client device's native operating system GUI and the particular operating system GUI not native to the client device.

10. The medium of claim 7, further comprising instructions for determining whether the application has an available update.

11. The medium of claim 7, further comprising instructions for performing appropriate functionality based upon monitored GUI interactions associated with the graphical element.

12. The medium of claim 7, further comprising instructions for initiating an application mashup operation by overlaying two graphical elements on the WOS GUI.

13. The medium of claim 7, wherein the determination of the availability of the set of applications for the determined WOS GUI configuration is based upon at least one of user's permission level, role, or group.

14. A system, comprising:

at least one computer configured to:

receive portal login credentials from a client device;

analyze configuration data to determine a desired graphical user interface (GUI) for the portal to present on the client device;

determine to present a particular web operating system (WOS) GUI configuration on the client device;

display a plurality of graphical elements representing a set of available applications on the determined WOS GUI configuration;

monitor the WOS for GUI interactions associated with the graphical element, wherein the monitoring includes:

identify user selection of a first graphical element from the plurality of graphical elements, wherein the first graphical element represents a first available application;

receive user input representing dragging of the first graphical element onto a second graphical element from the plurality of graphical elements, wherein the second graphical element is different than the first graphical element and wherein the second graphical element represents a second available application;

in response to receiving the user dragging input of the first graphical element onto the second graphical element, display a plurality of mashup layouts available for application mashup operation between the first and second available applications, wherein each of the displayed plurality of mashup layouts provides a graphical preview representing a particular mashup of the first and second available applications; and receive user input identifying user selection of a mashup layout from the displayed plurality of mashup layouts; and in response to the monitored GUI interactions:
    initiate an application mashup operation between the first and second available applications;
    dynamically calculate positions of the first and the second graphical elements associated with the first and second available applications in the selected mashup layout; and
    display an updated graphical element representing a mashup of the first and second available applications, wherein the updated graphical element replaces the second graphical element displayed on the WOS GUI configuration and wherein the updated graphical element reflects in miniature the first and second graphical elements arranged at the calculated positions in the selected mashup layout.

15. The system of claim 14, wherein the determination of the particular WOS GUI configuration to present on the client device is based upon one of the client device type, the configuration data, portal administrator settings, or historical data.

16. The system of claim 14, further configured to determine an availability of the application for the determined WOS GUI interface configuration.

17. The system of claim 14, further configured to determine whether the application has an available update.

18. The system of claim 14, further configured to perform appropriate functionality based upon monitored GUI interactions associated with the graphical element.

19. The system of claim 14, further configured to initiate an application mashup operation by overlaying two graphical elements on the WOS GUI.

* * * * *